(12) United States Patent
Fukuoka et al.

(10) Patent No.: US 11,050,107 B2
(45) Date of Patent: Jun. 29, 2021

(54) METHOD FOR ASSEMBLING BATTERY PACK, AND BATTERY PACK

(71) Applicant: Nissan Motor Co., Ltd., Yokohama (JP)

(72) Inventors: Manabu Fukuoka, Kanagawa (JP); Masayuki Nakai, Kanagawa (JP); Masahiro Nakamoto, Kanagawa (JP); Yui Suzuki, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 307 days.

(21) Appl. No.: 15/764,402

(22) PCT Filed: Oct. 22, 2015

(86) PCT No.: PCT/JP2015/079900
§ 371 (c)(1),
(2) Date: Mar. 29, 2018

(87) PCT Pub. No.: WO2017/068705
PCT Pub. Date: Apr. 27, 2017

(65) Prior Publication Data
US 2018/0287111 A1   Oct. 4, 2018

(51) Int. Cl.
*H01M 50/20*  (2021.01)
*H01M 50/502*  (2021.01)
*H01M 4/04*  (2006.01)
*H01M 10/04*  (2006.01)

(52) U.S. Cl.
CPC ............. *H01M 50/20* (2021.01); *H01M 4/04* (2013.01); *H01M 10/045* (2013.01); *H01M 50/502* (2021.01)

(58) Field of Classification Search
CPC .................................................. H01M 2/202
See application file for complete search history.

(56) References Cited

U.S. PATENT DOCUMENTS

| 2006/0275658 A1 | 12/2006 | Sanada et al. |
| 2013/0065103 A1 | 3/2013 | Yumura |
| 2013/0089773 A1* | 4/2013 | Kim ................... H01M 50/543 429/158 |
| 2013/0309538 A1 | 11/2013 | Pfeiffer et al. |
| 2014/0038021 A1 | 2/2014 | Goesmann et al. |
| 2014/0295235 A1 | 10/2014 | Jung |
| 2015/0132622 A1 | 5/2015 | Gohl et al. |

FOREIGN PATENT DOCUMENTS

| CN | 102906900 A | 1/2013 |
| CN | 103427054 A | 12/2013 |
| EP | 2381507 A1 | 10/2011 |
| JP | 2005-108693 A | 4/2005 |
| JP | 3749396 B2 | 2/2006 |
| JP | 2011-249243 A | 12/2011 |
| JP | 2012-515418 A | 7/2012 |
| JP | 2013-118115 A | 6/2013 |
| JP | 2013-229266 A | 11/2013 |
| JP | 2014-199813 A | 10/2014 |
| JP | 2015-11989 A | 1/2015 |
| JP | 2015-50187 A | 3/2015 |
| JP | 2015-99648 A | 5/2015 |
| JP | 2015-149238 A | 8/2015 |
| JP | 5916500 B2 | 5/2016 |
| KR | 10-2015-0031861 A | 3/2015 |
| KR | 10-2015-0060830 A | 6/2015 |

* cited by examiner

*Primary Examiner* — Ladan Mohaddes
(74) *Attorney, Agent, or Firm* — Global IP Counselors, LLP

(57) ABSTRACT

A method for assembling a battery pack having a cell group includes stacking the plurality of the unit cells such that distal end portions of the electrode tabs of the unit cells are bent along a stacking direction, disposing a pair of first cover members both ends of the unit cells in the stacking direction, disposing a pair of second cover members on both ends of the unit cells in a direction that intersects with the stacking direction, welding the first and second cover members while the cell group is pressurized using the first cover members. The welding of the first cover members and the second cover members is performed prior to electrically connecting the unit cells by a bus bar. The method further includes laser-welding the bus bar to distal end portions of the electrode tabs after the first cover members and the second cover members are welded.

24 Claims, 21 Drawing Sheets

METHOD FOR ASSEMBLING BATTERY PACK, AND BATTERY PACK

CROSS-REFERENCE TO RELATED APPLICATIONS

This application is a U.S. National stage application of International Application No. PCT/JP2015/079900, filed on Oct. 22, 2015.

BACKGROUND

Field of the Invention

The present invention relates to a method for assembling a battery pack, and a battery pack.

Background Information

In recent years, in the automobile industry, development of secondary batteries and fuel cells have been widely carried out, from the point of view of environmental protection and fuel economy. Since the output of each battery in a secondary battery is not very high, a desired number thereof are stacked to form a battery pack, in order to enable cruising speed in an automobile. As a conventional technique relating to battery packs, Japanese Laid Open Patent Application No. 2012-515418 (hereinafter referred to as Patent Document 1) discloses a technique in which a battery module, comprising a plurality of cell sub-assemblies housing unit cells that constitute a battery pack, is pressurized from the laterally outer side by using two strip members.

SUMMARY

If an external force acts on the battery pack of Patent Document 1, particularly in a direction that is orthogonal to the stacking direction, the strip members will suppress the movement of the cell sub-assemblies that constitute the battery module. However, the above-described strip member is small compared to the dimensions of the cell sub-assembly, and is not sufficient for suppressing the movement of the cell sub-assembly. If the cell sub-assembly moves from the initial state, and the position of the cell sub-assembly in the planar direction is displaced, it could have an effect on battery performance.

An object of the present invention is to provide a method for assembling a battery pack and a battery pack in which reliability against shock is improved.

The present invention that achieves the object described above is a method for assembling a battery pack having a cell group obtained by stacking, in the thickness direction, a plurality of unit cells provided with a cell body, which includes a power generation element and is formed into a flat shape, and an electrode tab protruding out from the cell body. In the method, a cell group is formed by stacking a plurality of unit cells, a pair of first cover members is disposed on the outer side of both ends of the cell group in the stacking direction of the unit cells, a pair of second cover members is disposed on the outer side of both ends of the cell group in a direction that intersects with the stacking direction and that also intersects with the direction in which the electrode tabs extend, and the pair of first cover members and the pair of second cover members are welded in a state in which pressurizing force is imparted to the cell group from both sides in the stacking direction using the pair of first cover members.

The present invention that achieves the object described above comprises a cell group obtained by stacking, in the thickness direction, a plurality of unit cells provided with a cell body, which includes a power generation element and is formed into a flat shape, and an electrode tab protruding out from the cell body, a pair of first cover members for covering the cell group from both sides in the stacking direction of the unit cells, and a pair of second cover members for covering the cell group from both sides in the direction that intersects with the stacking direction and that also intersects with the direction in which the electrode tabs extend. The pair of second cover members is joined to the pair of first cover members in a state in which the cell group is pressurized in the stacking direction by the pair of first cover members.

BRIEF DESCRIPTION OF THE DRAWINGS

FIG. 10 FIG. 10A is a perspective view illustrating a cross-section of the principle part of a state in which a bus bar is joined to the electrode tabs of stacked unit cells.

DETAILED DESCRIPTION OF EMBODIMENTS

Figure 1:
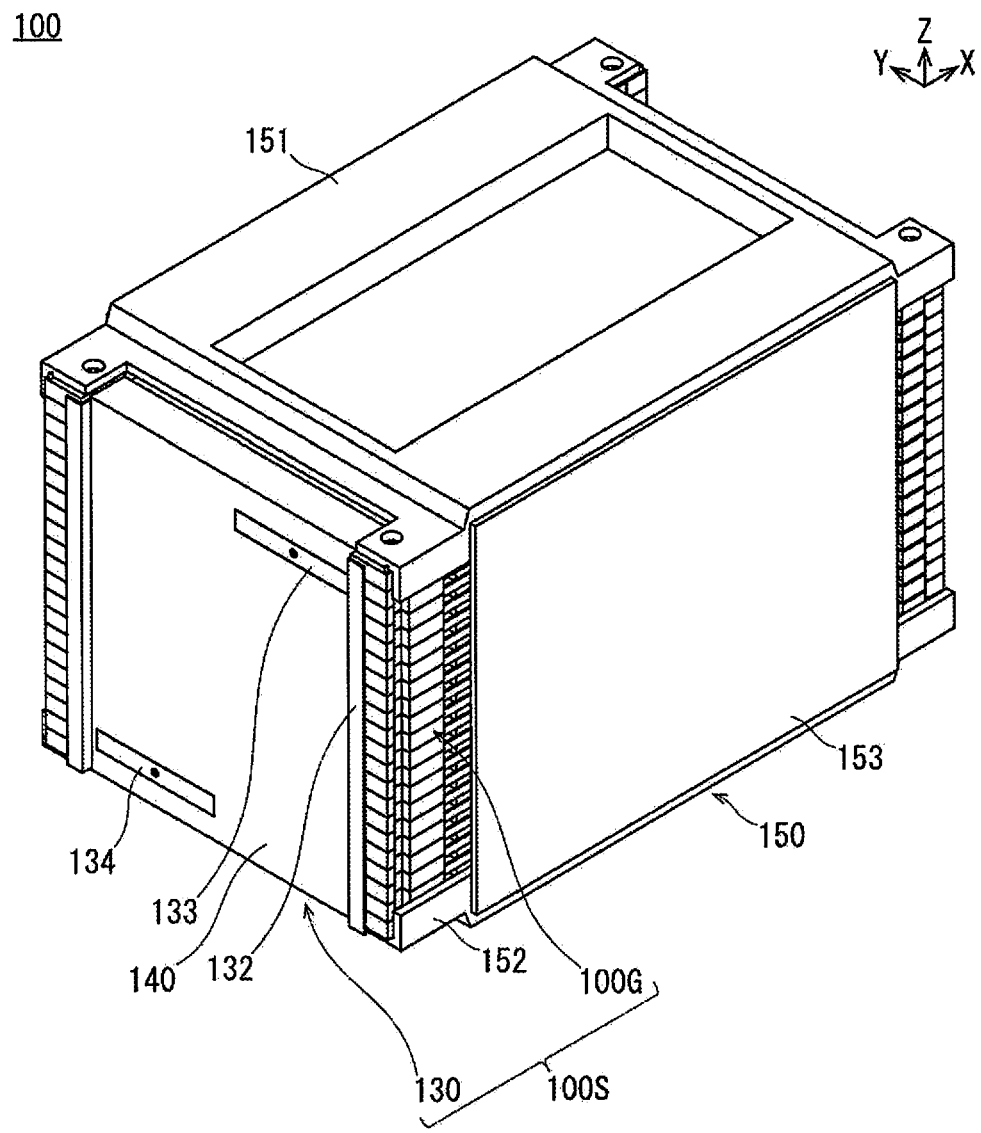
FIG. 1 is a perspective view illustrating the battery pack according to the first embodiment.

Embodiments of the present invention will be explained below, with reference to the appended drawings. In the explanations of the drawings, the same elements are given the same reference symbols, and overlapping explanations are omitted. The sizes and ratios of the members in the drawing are exaggerated for convenience of explanation, and may be different from the actual sizes and ratios. The orientation is shown using arrows indicated by X, Y, and Z in the drawings. The direction of the arrow indicated by X indicates a direction that intersects with the stacking direction of the unit cell 110 and a direction along the longitudinal direction of the unit cell 110. The direction of the arrow indicated by Y indicates a direction that intersects with the stacking direction of the unit cell 110 and a direction along the short side direction of the unit cell 110. The direction of the arrow indicated by Z is the stacking direction of the unit cell 110.

First Embodiment

First, a battery pack 100 according to the first embodiment will be described with reference to FIGS. 1-10.

Figure 2A:
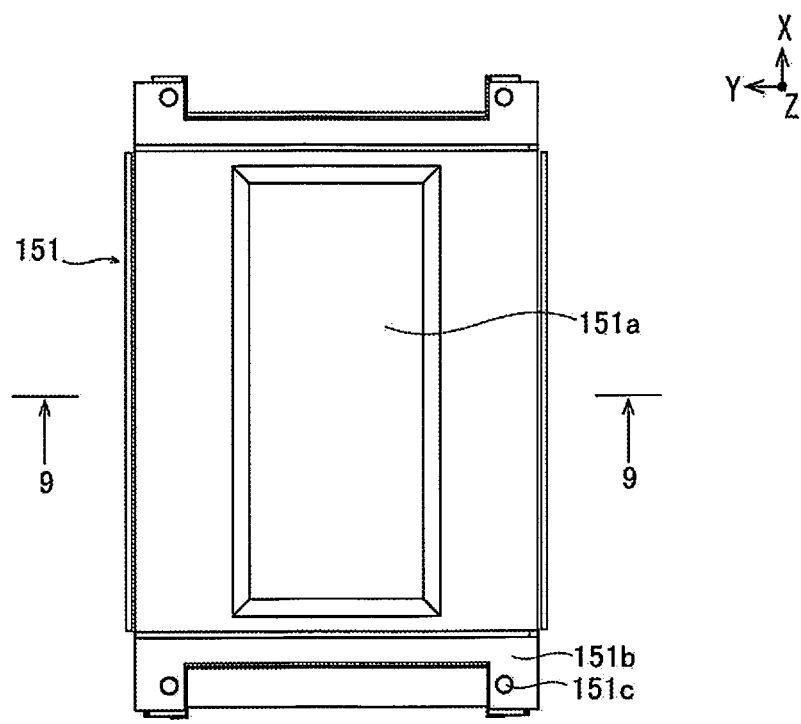
FIG. 2A and FIG. 2B are a plan view and a side view illustrating the battery pack of FIG. 1.
Figure 2B:
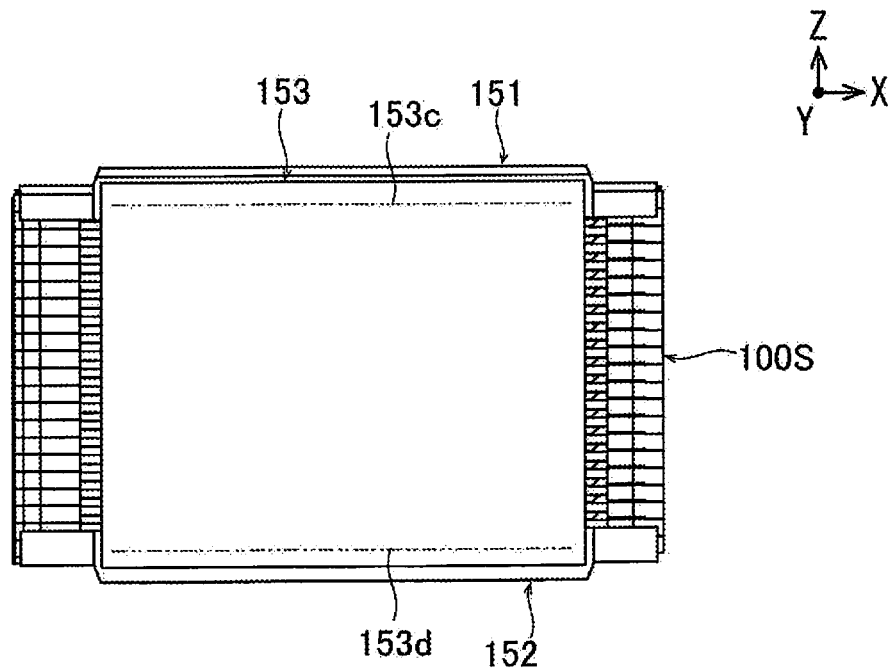
Figure 3:
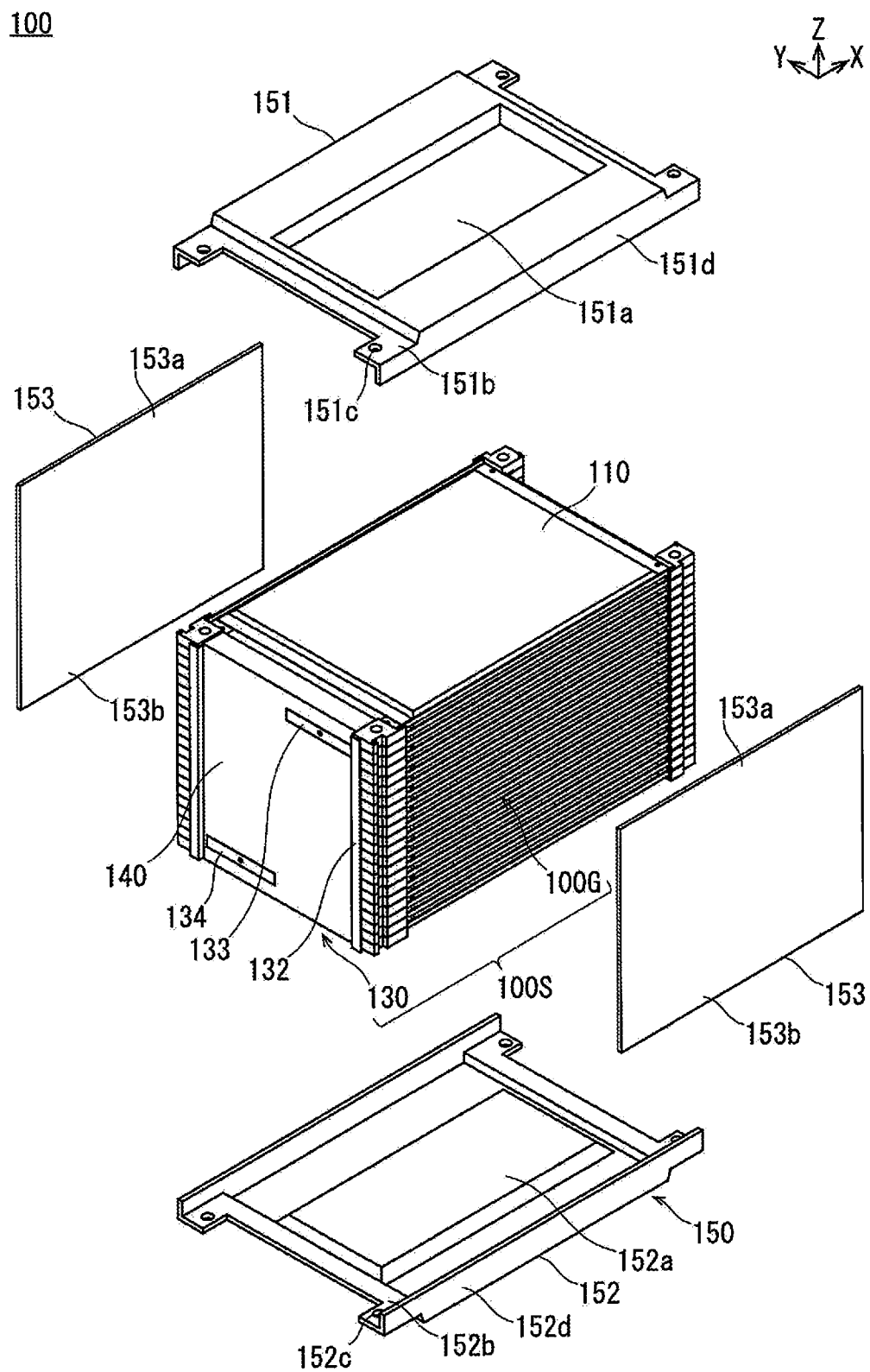
FIG. 3 is a perspective view illustrating a state in which the entire stacked body, in a state in which an upper pressure plate, a lower pressure plate, and left and right side plates are disassembled from the battery pack illustrated in FIG. 1 and a protective cover is attached thereto, is exposed.
Figure 4:
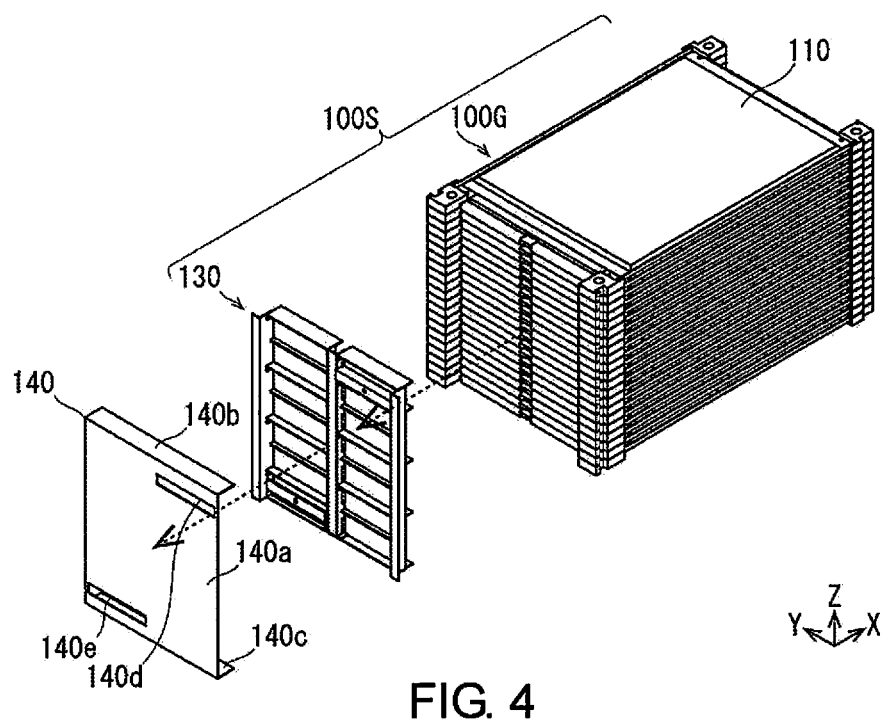
FIG. 4 is a perspective view illustrating a state in which the protective cover is detached from the stacked body illustrated in FIG. 2, and the stacked body is disassembled into a cell group and a bus bar unit.

FIG. 1 is a perspective view illustrating the battery pack 100 according to the first embodiment. FIG. 2A and FIG. 2B are a plan view and a side view illustrating the battery pack of FIG. 1. FIG. 3 is a perspective view illustrating a state in which the entire stacked body 100S, in a state in which an upper pressure plate 151, a lower pressure plate 152, and left and right side plates 153 are disassembled from the battery pack 100 illustrated in FIG. 1 and a protective cover 140 is attached thereto, is exposed. FIG. 4 is a perspective view illustrating a state in which the protective cover 140 is detached from the stacked body 100S illustrated in FIG. 2 and the stacked body 100S is disassembled into a cell group 100G and a bus bar unit 130.

Figure 5:
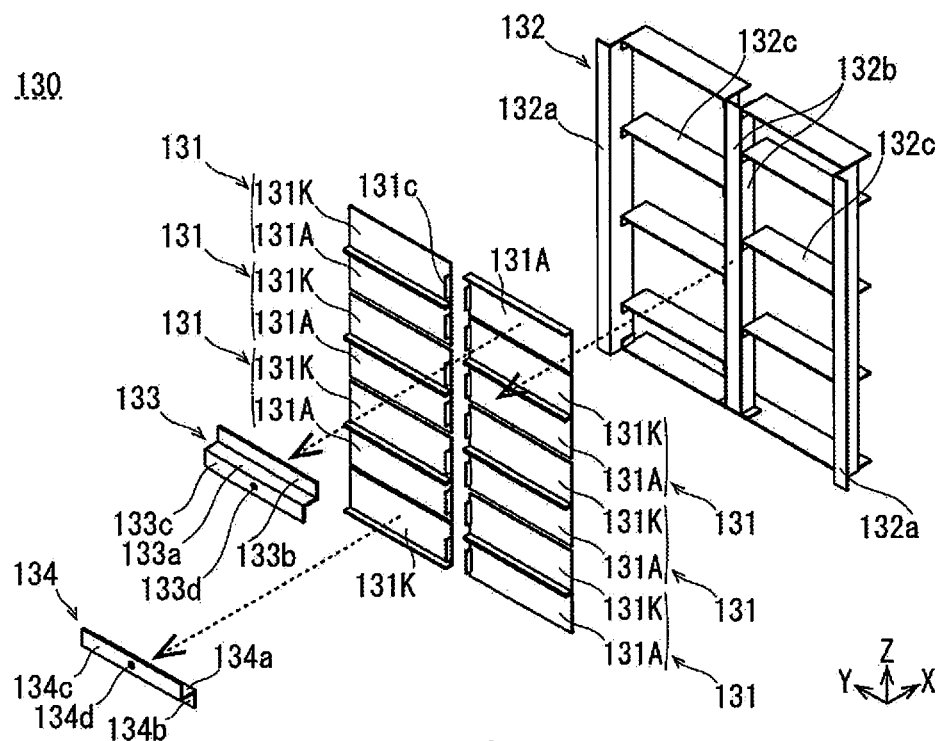
FIG. 5 is an exploded perspective view illustrating the bus bar unit illustrated in FIG. 3.
Figure 6:
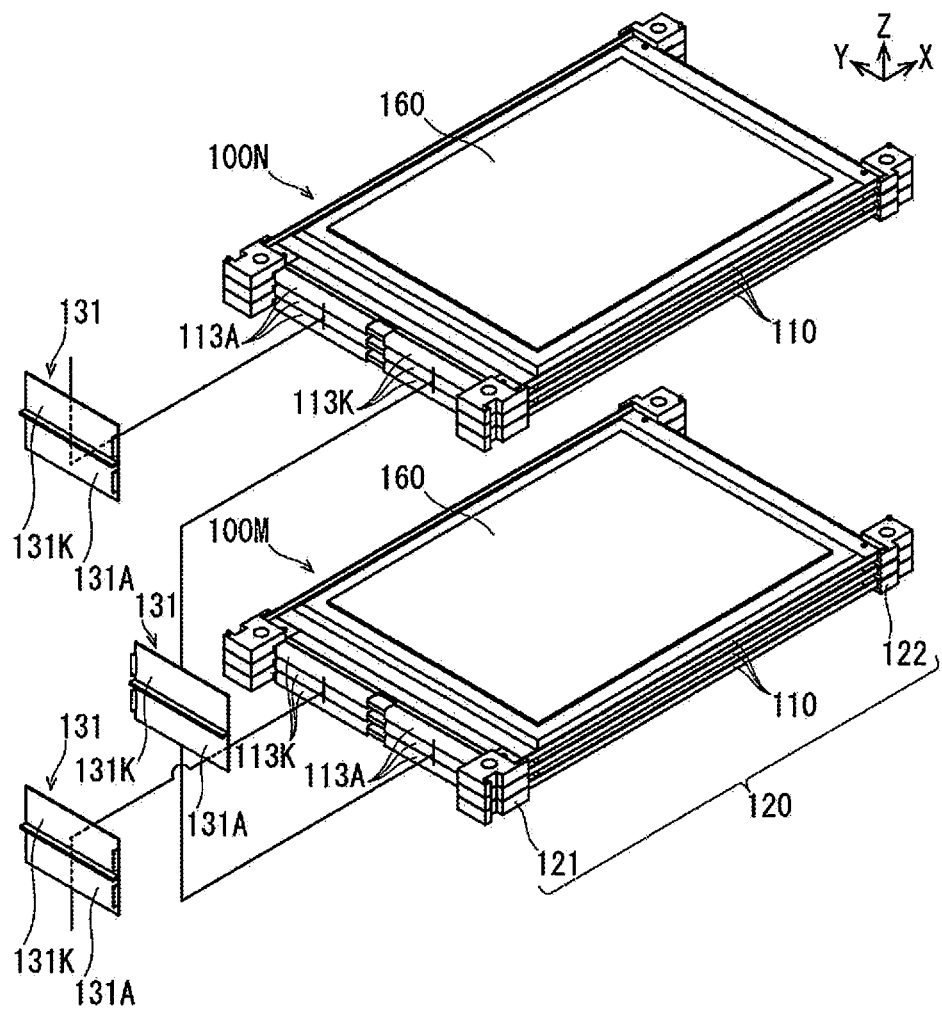
FIG. 6 is an exploded perspective view schematically illustrating a state in which an anode side electrode tab of a first cell sub-assembly (set of three of the unit cells connected in parallel) and a cathode side electrode tab of a second cell sub-assembly (set of three of the unit cells connected in parallel) are joined by using a bus bar.

FIG. 5 is an exploded perspective view illustrating the bus bar unit 130 illustrated in FIG. 3, and FIG. 6 is an exploded perspective view schematically illustrating a state in which an anode side electrode tab 113A of a first cell sub-assembly 100M (set of three of the unit cells 110 connected in parallel) and a cathode side electrode tab 113K of a second cell sub-assembly 100N (set of three of the unit cells 110 connected in parallel) are joined by a bus bar 131.

Figure 7A:
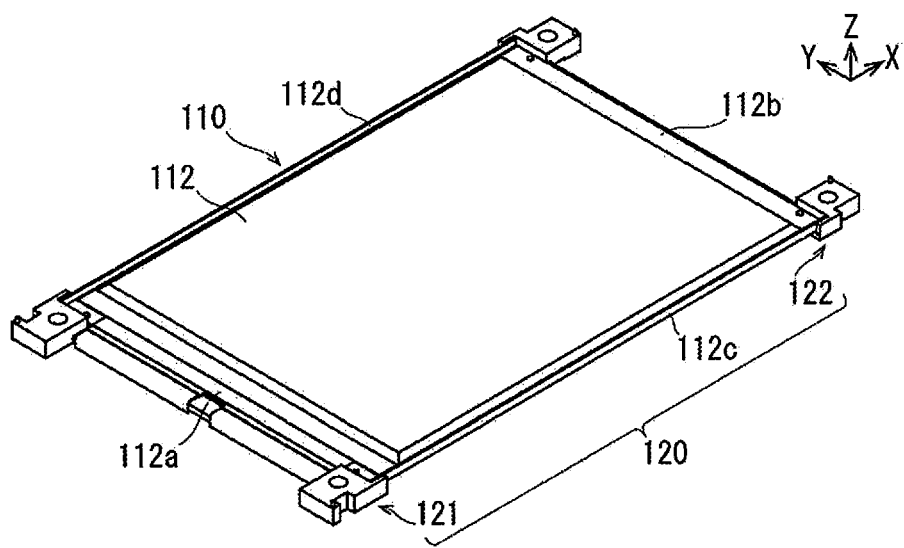
FIG. 7A is a perspective view illustrating a state in which a pair of spacers (first spacer and second spacer) is attached to a unit cell.
Figure 7B:
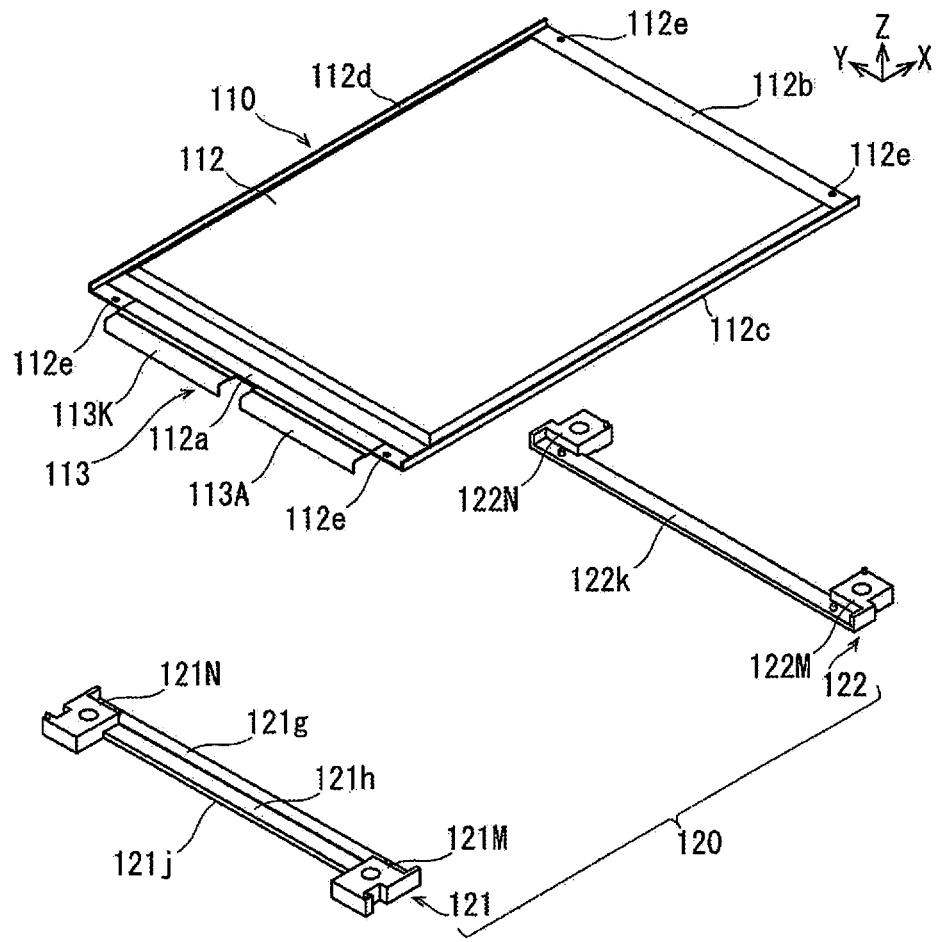
FIG. 7B is a perspective view illustrating a state in which the pair of spacers (first spacer and second spacer) is detached from the unit cell.
Figure 8:
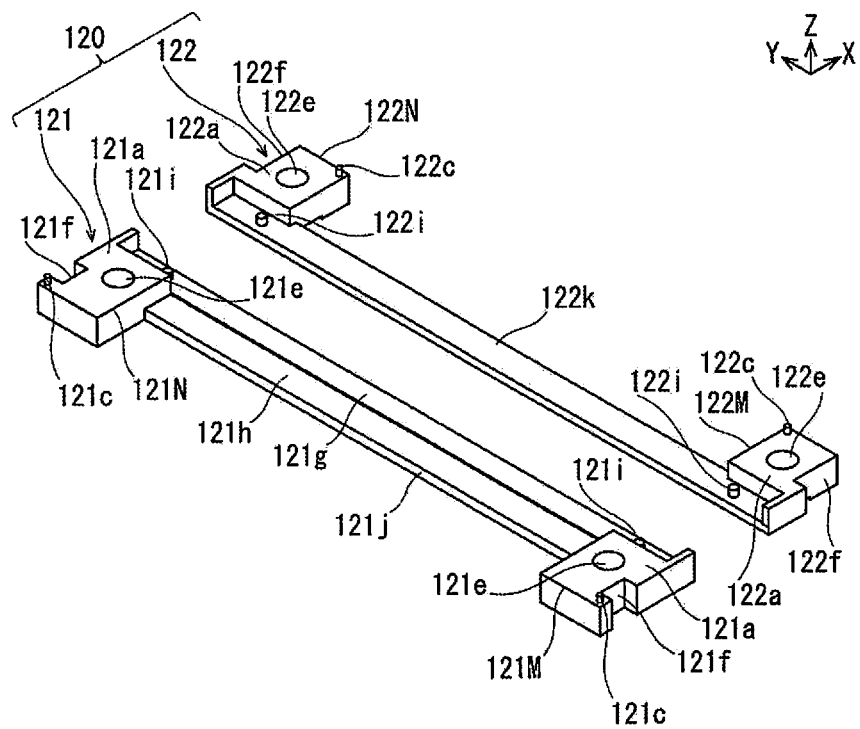
FIG. 8 is a perspective view illustrating the pair of spacers (first spacer and second spacer).
Figure 9:
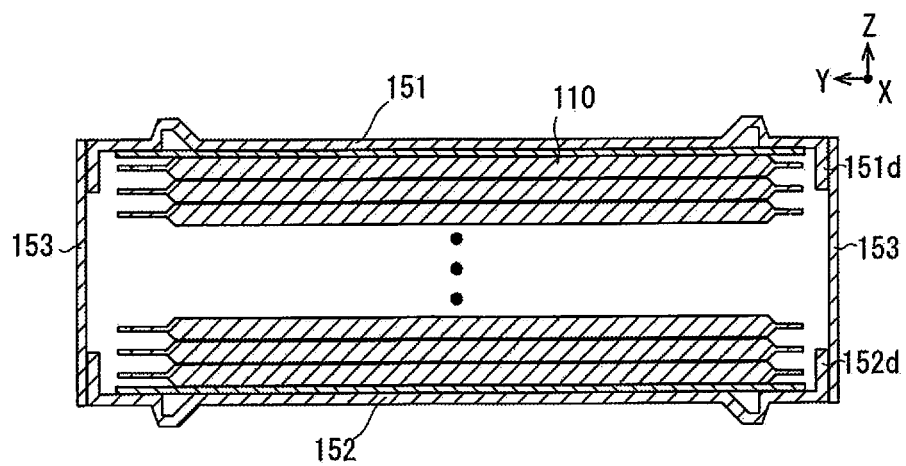
FIG. 9 is a cross-sectional view taken along the 9-9 line of FIG. 2A.

FIG. 7A is a perspective view illustrating a state in which a pair of spacers 120 (a first spacer 121 and a second spacer 122) is attached to the unit cell 110, and FIG. 7B is a perspective view illustrating a state in which the pair of spacers 120 (the first spacer 121 and the second spacer 122) is detached from the unit cell 110. FIG. 8 is a perspective view illustrating the pair of spacers (the first spacer 121 and the second spacer 122). FIG. 9 is a cross-sectional view taken along the 9-9 line of FIG. 2A.

Figure 10A:
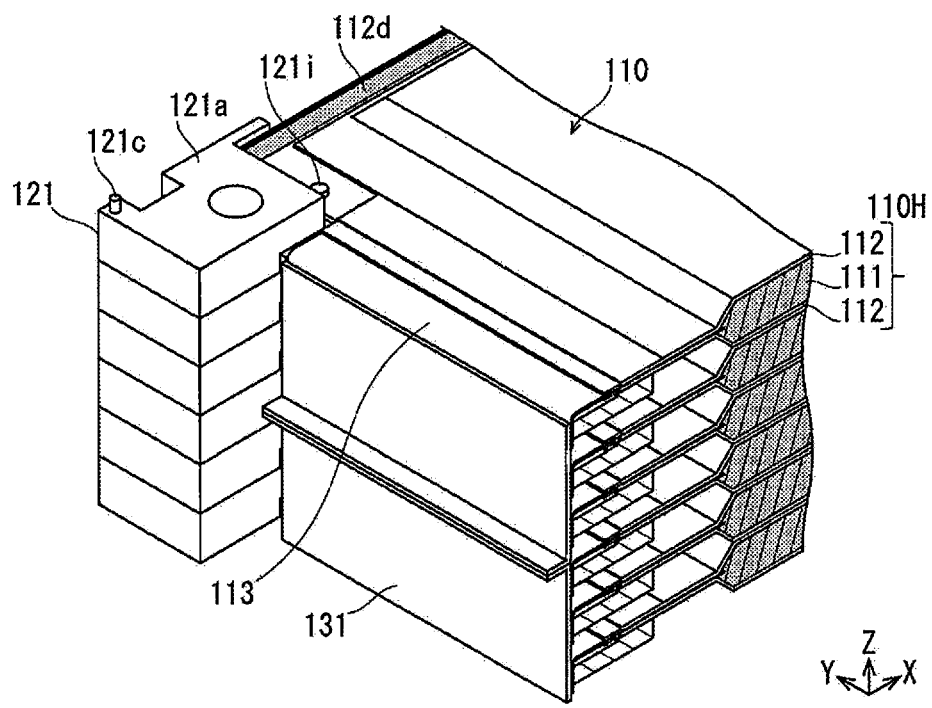
Figure 10B:
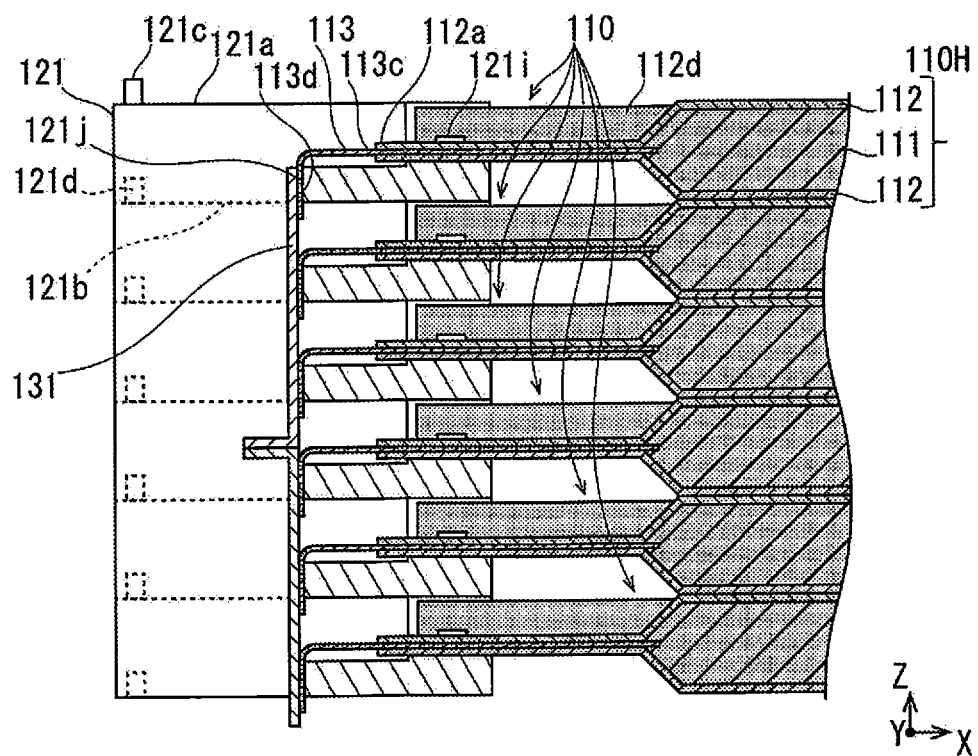
FIG. 10B is a side view illustrating FIG. 10A as viewed from the side.

FIG. 10A is a perspective view illustrating a cross-section of the principle part of a state in which a bus bar 131 is joined to the electrode tabs 113 of stacked unit cells 110, and FIG. 10B is a side view illustrating FIG. 10A as viewed from the side.

In the state illustrated in FIG. 1, the left front side is referred to as the "front side" of the entire battery pack 100 and of each component part, the right rear side is referred to as the "rear side" of the entire battery pack 100 and of each component part, and the right front side and the left rear side are referred to as the left and right "lateral sides" of the entire battery pack 100 and of each component part.

The battery pack 100 comprises a stacked body 100S and includes a cell group 100G formed by stacking a plurality of the unit cells 110 having a flat shape in the thickness direction, as illustrated in FIGS. 1 to 3. The battery pack 100 further comprises a protective cover 140 attached to the front side of the stacked body 100S, and a chassis 150 that houses the stacked body 100S in a state in which each of the unit cell 110 is pressurized along the stacking direction of the unit cells 110. The stacked body 100S comprises a cell group 100G and a bus bar unit 130 attached to the front side of the cell group 100G and that integrally holds a plurality of the bus bars 131, as illustrated in FIG. 4. The protective cover 140 covers and protects the bus bar unit 130. The bus bar unit 130 comprises a plurality of the bus bars 131 and a bus bar holder 132 that integrally attaches the plurality of the bus bars 131 in a matrix, as illustrated in FIG. 5. Of the plurality of the bus bars 131, an anode side terminal 133 is attached to the terminal end on the anode side, and a cathode side terminal 134 is attached to the terminal end on the cathode side.

Generally, the battery pack 100 according to the first embodiment comprises a cell group 100G obtained by stacking, in the thickness direction, a plurality of the unit cells 110 provided with a cell body 110H, which includes a power generation element 111 and is formed into a flat shape, and an electrode tab 113 protruding out from the cell body 110H, an upper pressure plate 151 and a lower pressure plate 152 (corresponding to a pair of first cover members) for covering the cell group 100G from both sides in the stacking direction Z of the unit cells 110, and a pair of side plates 153 (corresponding to a pair of second cover members) for covering the cell group 100G from both sides in the short side direction Y that intersects with the stacking direction Z and that also intersects with the longitudinal direction X in which the electrode tabs 113 extend. The side plates 153 are joined to the upper pressure plate 151 and the lower pressure plate 152, in a state in which the cell group 100G is pressurized in the stacking direction Z by using the upper pressure plate 151 and the lower pressure plate 152.

The cell group 100G is configured by connecting, in series, a first cell sub-assembly 100M comprising three of the unit cells 110 electrically connected in parallel and a second cell sub-assembly 100N comprising three different ones of the unit cells 110 electrically connected in parallel by the bus bars 131, as illustrated in FIG. 6.

The first cell sub-assembly 100M and the second cell sub-assembly 100N have the same configuration, excluding the bent directions of the distal end portions 113*d* of the electrode tabs 113 of the unit cells 110. Specifically, the second cell sub-assembly 100N is one in which the top and bottom of the unit cells 110 included in the first cell sub-assembly 100M are reversed. However, the bent direction of the distal end portions 113*d* of the electrode tabs 113 of the second cell sub-assembly 100N is aligned on the lower side of the stacking direction Z so as to be the same as the bent direction of the distal end portions 113*d* of the electrode tabs 113 of the first cell sub-assembly 100M. A pair of the spacers 120 (the first spacer 121 and the second spacer 122) is attached to each of the unit cells 110.

The unit cell 110 corresponds to, for example, a flat lithium ion secondary battery. The unit cell 110 comprises the cell body 110H obtained by sealing a power generation element 111 with a pair of laminate films 112, and a thin plate shaped electrode tab 113 that is electrically connected to the power generation element 111 and protruding out from the cell body 110H to the outside, as illustrated in FIG. 10A, FIG. 10B, and the like.

The power generation element 111 is formed by stacking a plurality of layers in which a positive electrode and a negative electrode are sandwiched by separators. The power generation element 111 is charged by receiving a supply of electric power from the outside, then it supplies electric power to an external electrical device while discharging.

The laminate film 112 is configured by covering both sides of a metal foil with a sheet having an insulating property. The pair of the laminate films 112 covers the power generation element 111 from both sides along the stacking direction Z to seal the four sides thereof. In the pair of the laminate films 112, an anode side electrode tab 113A and a cathode side electrode tab 113K protrude out from between end portions 112*a* along the short side direction Y to the outside, as illustrated in FIG. 7A and FIG. 7B.

In the laminate film 112, a pair of connecting pins 121*i* of the first spacer 121 is respectively inserted into a pair of connecting holes 112*e* respectively provided on both ends of the end portion 112*a* along the short side direction Y, as illustrated in FIG. 7A, FIG. 7B, and FIG. 8. On the other hand, in the laminate film 112, a pair of connecting pins 122*i* is respectively inserted into a pair of connecting holes 112*e* respectively provided on both ends of the other end portion 112*b* along the short side direction Y. In the laminate film 112, two end portions 112*c* and 112*d* along the longitudinal direction X are formed bent upward in the stacking direction Z.

The electrode tab 113 is configured from an anode side electrode tab 113A and a cathode side electrode tab 113K, which respectively extend from between the end portion 112*a* of a pair of laminate films 112 toward the outside, in a state of being separated from each other, as illustrated in FIG. 7A and FIG. 7B. The anode side electrode tab 113A is made of aluminum, in accordance with the characteristics of the anode side component members in the power generation element 111. The cathode side electrode tab 113K is made of copper, in accordance with the characteristics of the cathode side component members in the power generation element 111.

The electrode tab 113 is formed in an L shape from a proximal end portion 113*c* adjacent to the cell body 110H to the distal end portion 113*d*, as illustrated in FIG. 10B. Specifically, the electrode tab 113 extends from the proximal end portion 113*c* thereof along one side in the longitudinal direction X. On the other hand, the distal end portion 113*d* of the electrode tab 113 is bent downward along the stacking direction Z. The shape of the distal end portion 113*d* of the electrode tab 113 is not limited to an L shape. The distal end portion 113*d* of the electrode tab 113 is formed in a planar shape so as to face the bus bar 131. The electrode tab 113 may be formed in a U shape by further extending the distal end portion 113*d* and folding by using the extended portion along the proximal end portion 113*c* on the cell body 110H side. On the other hand, the proximal end portion 113*c* of the electrode tab 113 may be formed in a wave shape or a curved shape.

In the plurality of stacked unit cells 110, the distal end portion 113*d* of each electrode tab 113 is aligned and bent downward in the stacking direction Z, as illustrated in FIG. 10A and FIG. 10B. Here, in the battery pack 100, three of the unit cells 110 electrically connected in parallel (first cell sub-assembly 100M) and three different ones of the unit cells 110 electrically connected in parallel (second cell sub-assembly 100N) are connected in series, as illustrated in FIG. 6. Therefore, the top and bottom of the unit cells 110 are interchanged every three of the unit cells 110, such that the positions of the anode side electrode tabs 113A and the cathode side electrode tabs 113K of the unit cells 110 crisscross along the stacking direction Z.

However, if the top and bottom are simply interchanged every three of the unit cells 110 110, the positions of the distal end portions 113*d* of the electrode tabs 113 will differ in the vertical direction along the stacking direction Z; therefore, all of the distal end portions 113*d* of the electrode tabs 113 of the unit cells 110 are adjusted and bent so that the positions thereof will be aligned.

In the first cell sub-assembly 100M illustrated in the lower part of FIG. 6, the anode side electrode tab 113A is disposed on the right side of the drawing, and the cathode side electrode tab 113K is disposed on the left side of the drawing. On the other hand, in the second cell sub-assembly 100N illustrated in the upper part of FIG. 6, the cathode side electrode tab 113K is disposed on the right side of the drawing, and the anode side electrode tab 113A is disposed on the left side of the drawing.

In this manner, even if the arrangement of the anode side electrode tab 113A and the cathode side electrode tab 113K is different, the distal end portion 113*d* of the electrode tab 113 of the unit cell 110 is bent downward along the stacking direction Z. In addition, the distal end portions 113*d* of the electrode tabs 113 are arranged on the same side of the stacked body 100S, as illustrated in FIG. 10B. A double-sided tape 160 that is joined to a stacking member to be stacked above is adhered to the unit cells 110 positioned on the upper surfaces of the first cell sub-assembly 100M and the second cell sub-assembly 100N.

A pair of spacers 120 (first spacer 121 and second spacer 122) is disposed between stacked unit cells 110, as illustrated in FIG. 10B. The first spacer 121 is disposed along one end portion 112a of the planar direction XY in which the flat unit cell 110 extends, as illustrated in FIG. 7A and FIG. 7B. The second spacer 122 is disposed along the other end portion 112b of the planar direction XY in which the flat unit cell 110 extends, on the opposite side of the end portion 112a of the unit cell 110, as illustrated in FIG. 7A and FIG. 7B. The second spacer 122 has a configuration in which the shape of the first spacer 121 is simplified. A plurality of the unit cells 110 is stacked in the stacking direction Z, after attaching a pair of spacers 120 (first spacer 121 and second spacer 122) to each. The pair of spacers 120 (first spacer 121 and second spacer 122) is made of reinforced plastics having insulating properties. Below, after describing the configuration of the first spacer 121, the configuration of the second spacer 122 will be described while comparing with the configuration of the first spacer 121.

The first spacer 121 is formed of a rectangular parallelepiped shape, elongated along the short side direction Y, as illustrated in FIG. 7A, FIG. 7B, and FIG. 8. The first spacer 121 is provided with placing portions 121M and 121N on the two ends in the longitudinal direction thereof (short side direction Y).

When the first spacer 121 is stacked in a state of being attached to a unit cell 110, the upper surfaces 121a of the placing portions 121M and 121N of one first spacer 121 and the lower surfaces 121b of the placing portions 121M and 121N of another first spacer 121 disposed above the first spacer 121, come in contact, as illustrated in FIG. 10B.

In the first spacer 121, in order to relatively position the plurality of the unit cells 110 to be stacked, a positioning pin 121c provided on the upper surface 121a of one first spacer 121 is fitted with a positioning hole 121d that is opened on the lower surface 121b of another first spacer 121 and that corresponds to the position of the positioning pin 121c, as illustrated in FIG. 8 and FIG. 10B.

In the first spacer 121, a locating hole 121e for inserting a bolt that connects a plurality of battery packs 100 to each other along the stacking direction Z is opened in each of the placing portions 121M and 121N along the stacking direction Z, as illustrated in FIG. 8.

The first spacer 121 is formed such that the region between the placing portions 121M and 121N is notched from the upper side of the stacking direction Z, as illustrated in FIG. 8. The notched portion is provided with a first supporting surface 121g and a second supporting surface 121h along the longitudinal direction of the first spacer 121 (short side direction Y of the unit cell 110). The first supporting surface 121g is formed higher along the stacking direction Z and positioned further on the unit cell 110 side than the second supporting surface 121h.

The first spacer 121 carries and supports the end portion 112a of the laminate film 112, in which the electrode tab 113 is protruded, with the first supporting surface 121g, as illustrated in FIG. 7A and FIG. 7B. The first spacer 121 is provided with a pair of connecting pins 121i protruding upward from both ends of the first supporting surface 121g.

The first spacer 121 is provided with a supporting portion 121j, which abuts the electrode tab 113 from the opposite side of the bus bar 131 and supports the distal end portion 113d of the electrode tab 113 of the unit cell 110, on the side surface adjacent to the second supporting surface 121h along the stacking direction Z, as illustrated in FIG. 8 and FIG. 10B. The supporting portion 121j of the first spacer 121 sandwiches the distal end portion 113d of the electrode tab 113 together with the bus bar 131 such that the distal end portion 113d and the bus bar 131 are sufficiently abutting each other.

The second spacer 122 has a configuration in which the shape of the first spacer 121 is simplified, as illustrated in FIG. 7 and FIG. 8. The second spacer 122 corresponds to a configuration in which a portion of the first spacer 121 is removed along the short side direction Y of the unit cell 110. Specifically, the second spacer 122 is configured by replacing the second supporting surface 121h and the first supporting surface 121g of the first spacer 121 with a supporting surface 122k. Specifically, the second spacer 122 is provided with placing portions 122M and 122N, in the same manner as the first spacer 121. The second spacer 122 is provided with the supporting surface 122k in the portion where the region between the placing portions 122M and 122N is notched from the upper side of the stacking direction Z. The supporting surface 122k carries and supports the other end portion 112b of the laminate film 112. The second spacer 122 is provided with a positioning pin 122c, a positioning hole, a locating hole 122e, and a connecting pin 122i, in the same manner as the first spacer 121.

The bus bar unit 130 is integrally provided with a plurality of the bus bars 131, as illustrated in FIG. 4 and FIG. 5. The bus bar 131 is made of a metal having electrical conductivity and electrically connects the distal end portions 113d of the electrode tabs 113 of different unit cells 110 to each other. The bus bar 131 is formed in a flat plate shape and is erected along the stacking direction Z.

The bus bar 131 is integrally formed by joining an anode side bus bar 131A that is laser-welded with an anode side electrode tab 113A of one of the unit cells 110 to a cathode side bus bar 131K that is laser-welded with a cathode side electrode tab 113K of another unit cell 110 adjacent along the stacking direction Z.

The anode side bus bar 131A and the cathode side bus bar 131K have the same shape and are respectively formed in an L shape, as illustrated in FIG. 5. The anode side bus bar 131A and the cathode side bus bar 131K are superimposed with the top and bottom inverted. Specifically, the bus bar 131 is integrated by joining the bent portion of the end portion of the anode side bus bar 131A along the stacking direction Z to the bent portion of the end portion of the cathode side bus bar 131K along the stacking direction Z. The anode side bus bar 131A and the cathode side bus bar 131K are provided with side portions 131c at one end in the short side direction Y along the longitudinal direction X, as illustrated in FIG. 5. The side portions 131c are joined to the bus bar holder 132.

The anode side bus bar 131A is made of aluminum in the same manner as the anode side electrode tab 113A. The cathode side bus bar 131K is made of copper, in the same manner as the cathode side electrode tab 113K. The anode side bus bar 131A and the cathode side bus bar 131K made of different metals are joined to each other by ultrasonic joining.

For example, if the battery pack 100 is configured by connecting, in series, a plurality of sets of three of the unit cells 110 110 connected in parallel, as illustrated in FIG. 6, the anode side bus bar 131A portion of the bus bar 131 is laser-welded to the anode side electrode tabs 113A of three of the unit cells 110 110 that are adjacent to each other along the stacking direction Z. In the same manner, the cathode side bus bar 131K portion of the bus bar 131 is laser-welded to the cathode side electrode tabs 113K of three of the unit cells 110 110 that are adjacent to each other along the stacking direction Z.

However, among the bus bars 131 arranged in a matrix shape, the bus bar 131 positioned on the upper right in the drawing in FIG. 4 and FIG. 5 corresponds to the anode side terminal ends of 21 of the unit cells 110 (3 parallel 7 series) and is configured from only an anode side bus bar 131A. This anode side bus bar 131A is laser-welded with the anode side electrode tabs 113A of the three uppermost unit cells 110 of the cell group 100G. In the same manner, among the bus bars 131 arranged in a matrix shape, the bus bar 131 positioned on the lower left in the drawing in FIG. 4 and FIG. 5 corresponds to the cathode side terminal ends of 21 of the unit cells 110 (3 parallel 7 series) and is configured from only a cathode side bus bar 131K. This cathode side bus bar 131K is laser-welded to the cathode side electrode tabs 113K of the three lowermost ones of the unit cells 110 of the cell group 100G.

The bus bar holder 132 integrally holds a plurality of the bus bars 131 in a matrix so as to face the electrode tab 113 of each of a plurality of the stacked unit cells 110, as illustrated in FIG. 4 and FIG. 5. The bus bar holder 132 is made of resin having insulating properties and is formed in a frame shape.

The bus bar holder 132 is respectively provided with a pair of columnar support portions 132a erected along the stacking direction Z, so as to be positioned on both sides of the longitudinal direction of the first spacers 121 that support the electrode tabs 113 of the unit cells 110, as illustrated in FIG. 5. The pair of columnar support portions 132a is fitted to the side surfaces of the placing portions 121M and 121N of the first spacer 121. The pair of columnar support portions 132a have an L shape when viewed along the stacking direction Z, and is formed in a plate shape extended along the stacking direction Z. The bus bar holder 132 is provided with a pair of auxiliary columnar support portions 132b at an interval, erected along the stacking direction Z so as to be positioned in the vicinity of the center of the first spacer 121 in the longitudinal direction. The pair of auxiliary columnar support portions 132b is formed in a plate shape extended along the stacking direction Z.

The bus bar holder 132 comprises insulating portions 132c that respectively protrude between adjacent bus bars 131 along the stacking direction Z, as illustrated in FIG. 5. The insulating portions 132c are formed in a plate shape extended along the short side direction Y. Each of the insulating portions 132c is provided horizontally between the columnar support portion 132a and the auxiliary columnar support portion 132b. The insulating portion 132c prevents discharge by insulating the space between bus bars 131 of the unit cells 110 that are adjacent to each other along the stacking direction Z.

The bus bar holder 132 can be configured by joining the columnar support portion 132a, the auxiliary columnar support portion 132b, and the insulating portion 132c, which are independently formed, or be configured by integrally molding the columnar support portion 132a, the auxiliary columnar support portion 132b, and the insulating portion 132c.

The anode side terminal 133 corresponds to the anode side terminal end of the cell group 100G configured by alternately stacking the first cell sub-assembly 100M and the second cell sub-assembly 100N, as illustrated in FIG. 4 and FIG. 5.

The anode side terminal 133 is joined to the anode side bus bar 131A positioned on the upper right in the drawing, from among the bus bars 131 arranged in a matrix, as illustrated in FIG. 4 and FIG. 5. The anode side terminal 133 is made of a metal plate having electrical conductivity and, when viewed along the short side direction Y, has a shape in which the end portion 133b and the other end portion 133c are bent in different directions along the stacking direction Z with reference to the central portion 133a. The end portion 133b is joined to the anode side bus bar 131A by laser welding, or the like. An external input/output terminal is connected to a hole 133d (including the screw groove) opened in the center of the other end portion 133c.

The cathode side terminal 134 corresponds to the cathode side terminal end of the cell group 100G configured by alternately stacking the first cell sub-assembly 100M and the second cell sub-assembly 100N, as illustrated in FIG. 4 and FIG. 5. The cathode side terminal 134 is joined to the cathode side bus bar 131K positioned on the lower left in the drawing, from among the bus bars 131 arranged in a matrix, as illustrated in FIG. 4 and FIG. 5. The cathode side terminal 134 is configured in the same manner as the anode side terminal 133.

The protective cover 140 prevents the bus bars 131 from short-circuiting with each other and from coming in contact with an external member and being short-circuited or causing electrical leakage, by covering the bus bar unit 130, as illustrated in FIGS. 1, 3, and 4. Furthermore, the protective cover 140 exposes the anode side terminal 133 and the cathode side terminal 134 to the outside, and causes the power generation element 111 of each unit cell 110 to charge and discharge. The protective cover 140 is made of plastics having insulating properties.

The protective cover 140 is formed in a flat plate shape and is erected along the stacking direction Z, as illustrated in FIG. 4. The protective cover 140 has a shape in which the upper end 140b and the lower end 140c of the side surface 140a thereof are bent along the longitudinal direction X, and is fitted to the bus bar unit 130.

The side surface 140a of the protective cover 140 is provided with a first opening 140d formed of a rectangular hole that is slightly larger than the anode side terminal 133, in a position that corresponds to the anode side terminal 133 provided on the bus bar unit 130, as illustrated in FIG. 3 and FIG. 4. In the same manner, the side surface 140a of the protective cover 140 is provided with a second opening 140e formed of a rectangular hole that is slightly larger than the cathode side terminal 134, in a position that corresponds to the cathode side terminal 134 provided on the bus bar unit 130.

The chassis 150 houses the cell group 100G in a state of being pressurized along the stacking direction, as illustrated in FIG. 1, FIG. 2B, and FIG. 9. An appropriate surface pressure is imparted to the power generation element 111 by sandwiching and pressurizing the power generation element 111 of each unit cell 110 provided on the cell group 100G with the upper pressure plate 151 and the lower pressure plate 152. In other words, the height of the cell group 100G in the battery pack 100 is configured to be lower than the height when the same number of unit cells 110 as that of the cell group 100G are stacked in a non-loaded state by using the upper pressure plate 151 and the lower pressure plate 152.

The upper pressure plate 151 is disposed above the cell group 100G along the stacking direction Z, as illustrated in FIG. 1 and FIG. 3. The upper pressure plate 151 is provided with a pressing surface 151a protruding downward along the stacking direction Z in the center thereof. The power generation element 111 of each unit cell 110 is pressed downward by the pressing surface 151a. The upper pressure plate 151 is provided with a holding portion 151b extended along the longitudinal direction X from both sides along the short side direction Y. The holding portion 151b covers the placing portions 121M and 121N of the first spacer 121, or the placing portions 122M and 122N of the second spacer 122. A locating hole 151c, which communicates with the positioning hole 121d of the first spacer 121 or the positioning hole 122d of the second spacer 122 along the stacking direction Z, positions the placing portions 121 and 122 in the center of the holding portion 151b. A bolt that connects battery packs 100 with each other is inserted into the locating hole 151c. The upper pressure plate 151 is made of a metal plate having a sufficient thickness. In addition, the upper pressure plate 151 comprises a bent portion 151d formed by bending both ends in the short side direction Y that intersects the stacking direction Z, as a joint portion with the side plate 153, as illustrated in FIG. 3 and FIG. 9.

The lower pressure plate 152 has the same configuration as the upper pressure plate 151 and is formed by reversing the top and bottom of the upper pressure plate 151, as illustrated in FIG. 1 and FIG. 3. The lower pressure plate 152 is disposed below the cell group 100G along the stacking direction Z. The lower pressure plate 152 presses the power generation element 111 of each unit cell 110 upward with the pressing surface 152a protruding upward along the stacking direction Z. In addition, the lower pressure plate 152 comprises a bent portion 152d formed by bending both ends in the short side direction Y that intersects the stacking direction Z, as a joint portion with the side plate 153, as illustrated in FIG. 3 and FIG. 9.

One pair of side plates 153 fixes the relative positions of the upper pressure plate 151 and the lower pressure plate 152 such that the upper pressure plate 151 and the lower pressure plate 152, which sandwich and press the cell group 100G from above and below in the stacking direction Z, are not separated from each other, as illustrated in FIG. 1, FIG. 3, and FIG. 9. The side plate 153 is made of a rectangular metal plate and is erected along the stacking direction Z. The pair of side plates 153 is disposed outward of the bent portion 151d of the upper pressure plate 151 and the bent portion 152d of the lower pressure plate 152, as illustrated in FIG. 9. The pair of side plates 153 is joined to the upper pressure plate 151 and the lower pressure plate 152 from both sides in the short side direction Y of the cell group 100G by laser welding. In each of the side plates 153, a linear welding portion 153c (corresponding to the joint portion) is formed at one location by seam welding, or the like, at the upper end 153a portion that abuts the upper pressure plate 151 along the longitudinal direction X, as illustrated in FIG. 2B. In the same manner, in each of the side plates 153, a linear welding portion 153d (corresponding to the joint portion) is formed at one location by seam welding, or the like, at the lower end 153b portion that abuts the lower pressure plate 152 along the longitudinal direction X. The pair of side plates 153 covers and protects both sides of the cell group 100G in the short side direction Y.

Next, the manufacturing method of the battery pack 100 will be described, with reference to FIGS. 11-18.

The manufacturing method (manufacturing steps) of the battery pack 100 comprises a stacking step (FIG. 11) for stacking the members configuring the battery pack 100, a pressurizing step (FIG. 12) for pressurizing the cell group 100G of the battery pack 100, a first joining step (FIG. 13) for joining the side plates 153 to the upper pressure plate 151 and the lower pressure plate 152, a second joining step (FIGS. 14-17) for joining the bus bar 131 to the electrode tab 113 of the unit cell 110 and the terminal to the bus bar 131, and a mounting step (FIG. 18) for attaching the protective cover 140 to the bus bar 131.

First, the stacking step for stacking the members configuring the battery pack 100 will be described, with reference to FIG. 11.

Figure 11:
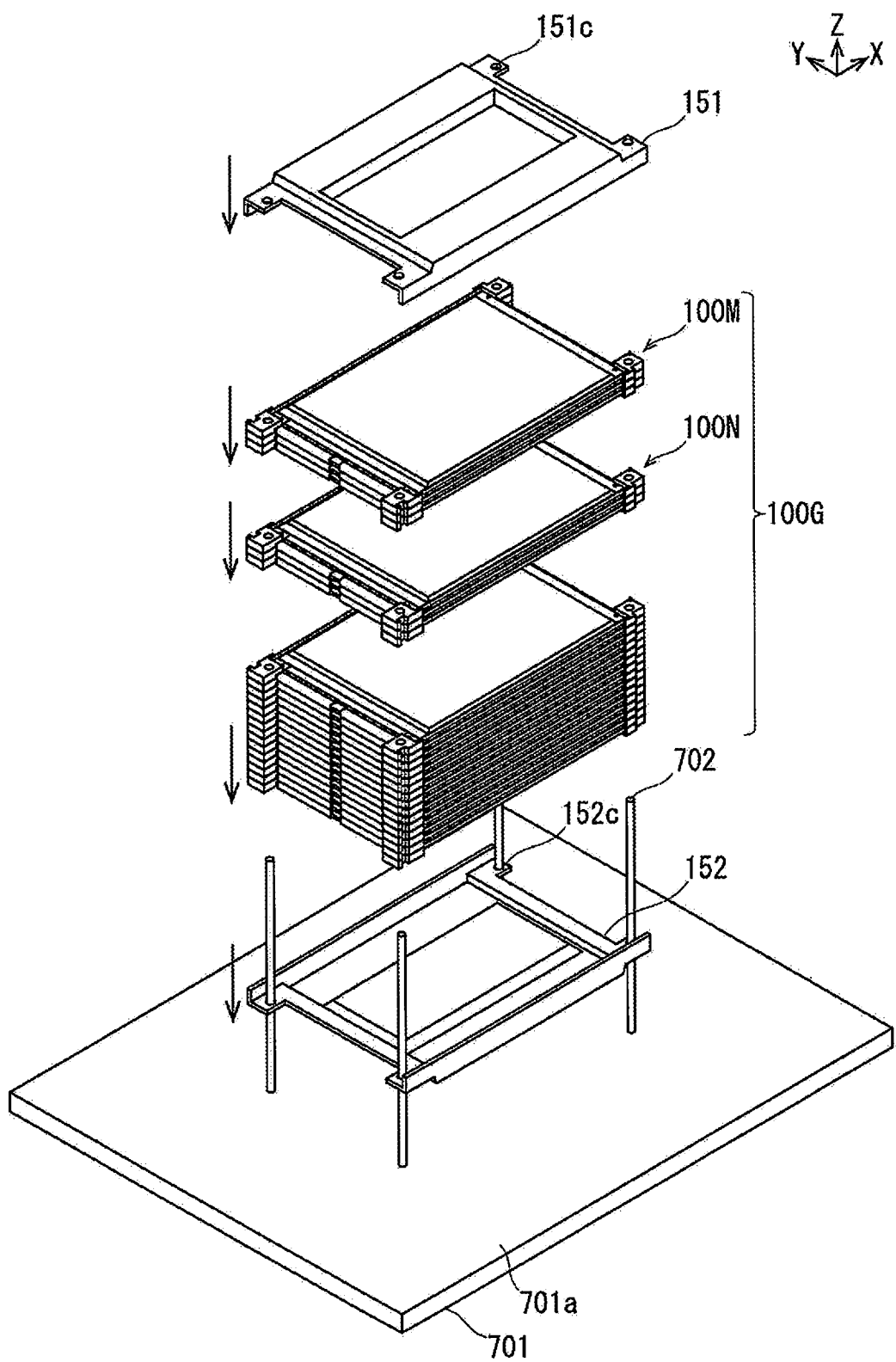
FIG. 11 is a view illustrating the battery pack manufacturing method according to the first embodiment, and a perspective view schematically illustrating a state in which members constituting a battery pack are sequentially stacked on a mounting table.

FIG. 11 is a view illustrating the battery pack 100 manufacturing method according to the first embodiment and a perspective view schematically illustrating a state in which members constituting the battery pack 100 are sequentially stacked on a mounting table 701.

The mounting table 701 used for the stacking step is formed in a plate shape and is provided along a horizontal plane. The mounting table 701 comprises positioning locating pins 702 for positioning the relative positions of the lower pressure plate 152, the first cell sub-assembly 100M, the second cell sub-assembly 100N, and the upper pressure plate 151, which are sequentially stacked, along the longitudinal direction X and the short side direction Y. Four locating pins 702 are erected on the upper surface 701a of the mounting table 701 with predetermined intervals there between. The intervals between the four locating pins 702 from each other correspond, for example, to the intervals between the locating holes 152c provided on the four corners of the upper pressure plate 151. The members constituting the battery pack 100 are stacked using a robot arm, a hand lifter, a vacuum adsorption type collet, or the like.

In the stacking step, the lower pressure plate 152 is lowered along the stacking direction Z and mounted on the upper surface 701a of the mounting table 701, in a state in which the locating holes 152c provided on the four corners thereof are inserted into the locating pins 702 by using a robot arm, as illustrated in FIG. 11. Next, the first cell sub-assembly 100M is lowered along the stacking direction Z and mounted on the lower pressure plate 152, in a state in which the locating holes provided on the first spacer 121 and the second spacer 122, which are component members thereof, are inserted into the locating pins 702 by using a robot arm. In the same manner, three sets each of the second cell sub-assembly 100N and the first cell sub-assembly 100M are alternately stacked by using the robot arm. A double-sided tape 160 that is joined to a stacking member to be stacked above is adhered to the upper surfaces of the first cell sub-assembly 100M and the second cell sub-assembly 100N. Then, the upper pressure plate 151 is lowered along the stacking direction Z and stacked on the first cell sub-assembly 100M, in a state in which the locating holes 151c provided on the four corners thereof are inserted into the locating pins 702 by using a robot arm. The cell group 100G is thereby formed, and the upper pressure plate 151 and the lower pressure plate 152 are disposed on both sides of the cell group 100G in the stacking direction Z.

Next, the pressurizing step for pressurizing the cell group 100G of the battery pack 100 will be described with reference to FIG. 12.

Figure 12:
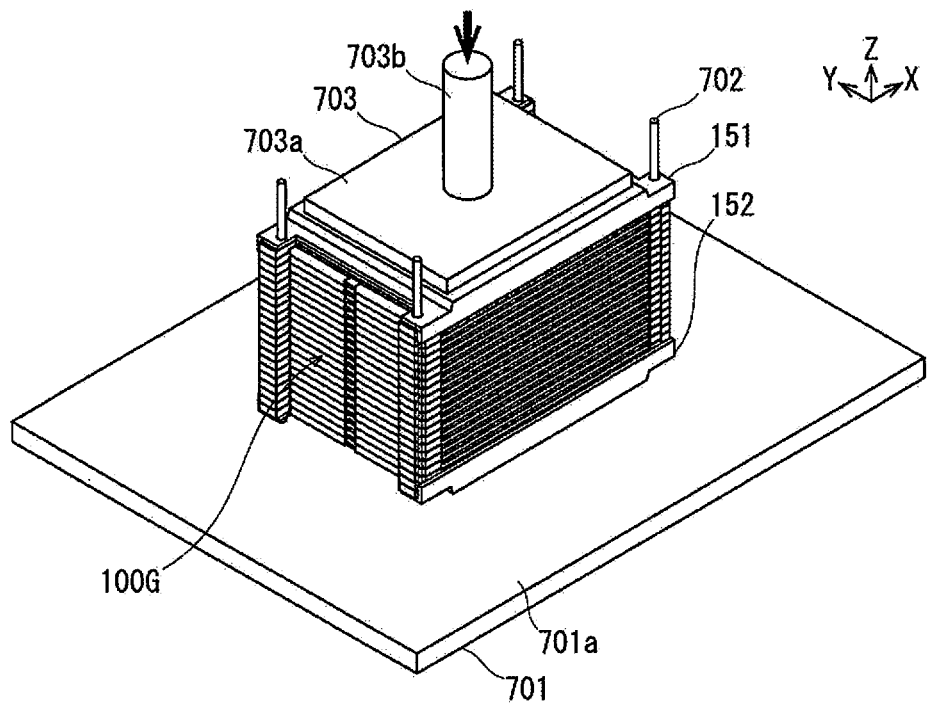
FIG. 12 is a perspective view schematically illustrating a state in which the component members of a battery pack are pressed from above, following FIG. 11.

FIG. 12 is a perspective view schematically illustrating a state in which the component members of the battery pack 100 are pressed from above, following FIG. 11.

A pressurizing jig 703 used in the pressurizing step comprises a pressurizing portion 703a that is formed in a plate shape and provided along a horizontal plane and a supporting portion 703b that is formed in a cylindrical shape and that is erected and joined to the upper surface of the pressurizing portion 703a. The supporting portion 703b connects a hydraulic cylinder and an electric stage that are driven along the stacking direction Z. The pressurizing portion 703a moves above and below along the stacking direction Z via the supporting portion 703b. The pressurizing portion 703a pressurizes the abutted stacking members.

In the pressurizing step, the pressurizing portion 703a of the pressurizing jig 703 is lowered downward along the stacking direction Z while being abutted on the upper pressure plate 151 by the electric stage connected to the supporting portion 703b being driven, as illustrated in FIG. 12. The cell group 100G is sandwiched and pressurized by using the upper pressure plate 151 that is pressed downward and the lower pressure plate 152 that is mounted on the mounting table 701. An appropriate surface pressure is imparted to the power generation element 111 of each unit cell 110 provided on the cell group 100G. The pressurizing step is continued until the next first joining step is completed.

Next, the first joining step in which the side plates 153 are joined to the upper pressure plate 151 and the lower pressure plate 152 will be described with reference to FIG. 13.

Figure 13:
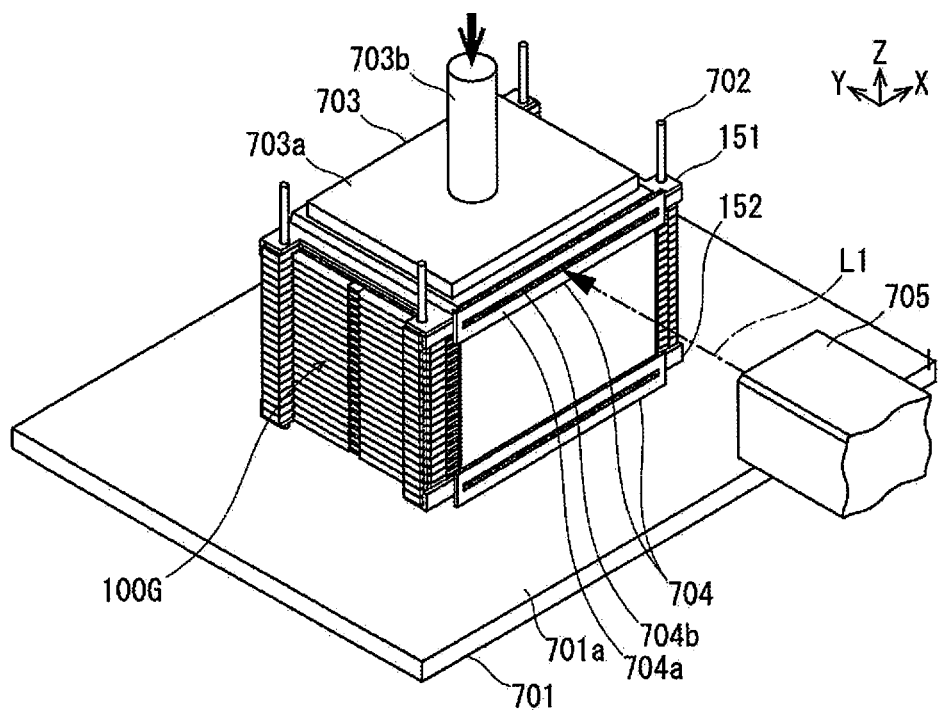
FIG. 13 is a perspective view schematically illustrating a state in which a side plate is laser-welded to an upper pressure plate and a lower pressure plate, following FIG. 12.

FIG. 13 is a perspective view schematically illustrating a state in which the side plates 153 are laser-welded to the upper pressure plate 151 and the lower pressure plate 152, following FIG. 12.

A pushing plate 704 used in the first joining step respectively presses the side plates 153 to the upper pressure plate 151 and the lower pressure plate 152, to respectively bring the side plates 153 in close contact with the upper pressure plate 151 and the lower pressure plate 152. The pushing plate 704 is made of metal and formed in an elongated plate shape. A linear slit 704b is opened in a main body 704a of the pushing plate 704 along the longitudinal direction. The short side direction of the pushing plate 704 is erected along the stacking direction Z. The pushing plate 704 presses the side plate 153 with the main body 704a and allows laser light L1 for welding to pass through the slit 704b.

A laser oscillator 705 is the light source for joining the side plates 153 to the upper pressure plate 151 and the lower pressure plate 152. The laser oscillator 705 is configured from, for example, a YAG (yttrium aluminum garnet) laser. The laser light L1 that is led out from the laser oscillator 705 is irradiated onto the upper end 153a and the lower end 153b of the side plate 153, in a state in which the light path is adjusted by using, for example, an optical fiber or a mirror, and condensed by using a condenser lens. The laser light L1 that is led out from the laser oscillator 705 may be split by using a half-mirror and irradiated onto the upper end 153a and the lower end 153b of the side plate 153 at the same time.

In the first joining step, a laser oscillator 705 horizontally scans laser light L1 onto the upper end 153a of the side plate 153 that is pressed by the pushing plate 704 via the slit 704b of the pushing plate 704, and subjects the side plate 153 and the upper pressure plate 151 to seam welding at a plurality of locations, as illustrated in FIG. 13. In the same manner, the laser oscillator 705 horizontally scans laser light L1 onto the lower end 153b of the side plate 153 that is pressed by the pushing plate 704 via the slit 704b of the pushing plate 704, and subjects the side plate 153 and the lower pressure plate 152 to seam welding at a plurality of locations.

Accordingly, the upper pressure plate 151, the lower pressure plate 152, and the side plates 153 are welded, in a state in which pressurizing force is imparted to the cell group 100G from both sides in the stacking direction Z, using the upper pressure plate 151 and the lower pressure plate 152.

In addition, the positions of the first spacer 121 and the second spacer 122 in the cell group 100G are fixed by using the first joining step.

Next, the second joining step in which the bus bar 131 is joined to the electrode tabs 113 of the unit cell 110 and the terminal is joined to the bus bar 131 will be described with reference to FIGS. 14-17.

Figure 14:
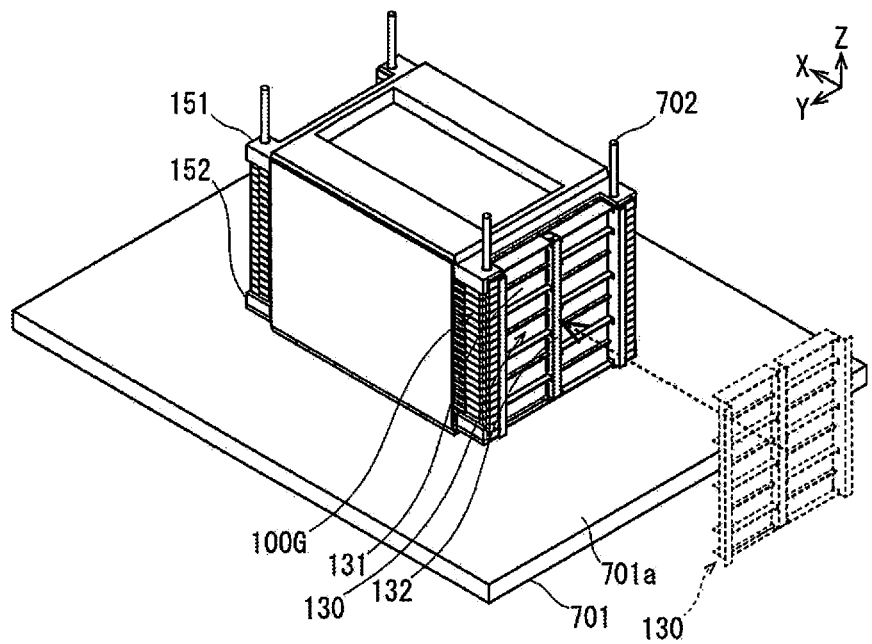
FIG. 14 is a perspective view schematically illustrating a state in which a part of the members of the bus bar unit is attached to the cell group, following FIG. 13.
Figure 15:
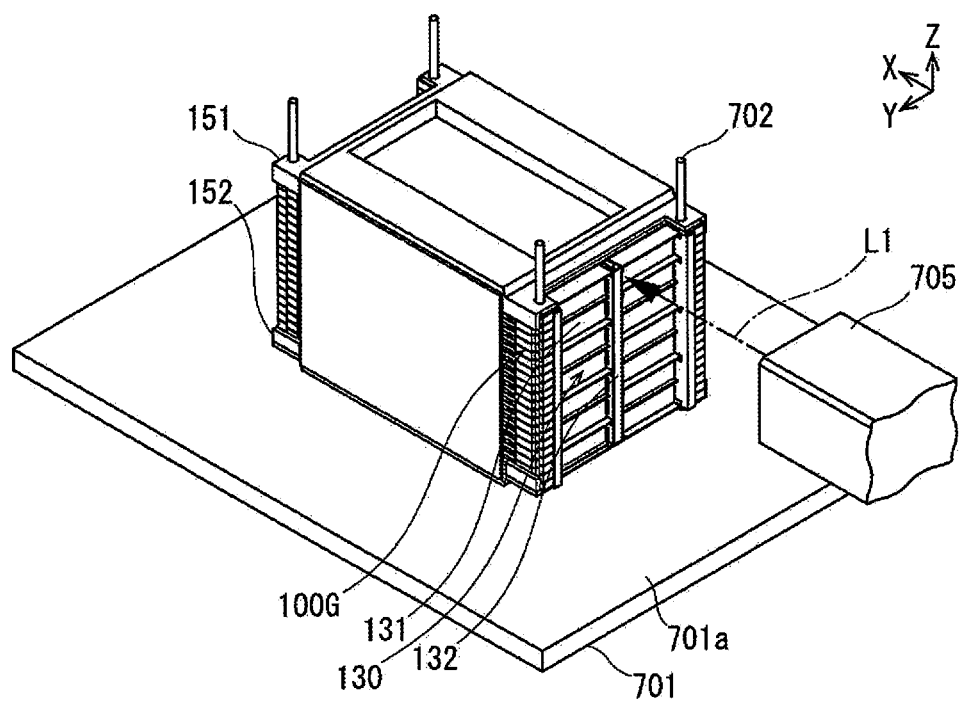
FIG. 15 is a perspective view schematically illustrating a state in which the bus bar of the bus bar unit is laser-welded to the electrode tabs of the unit cell, following FIG. 14.
Figure 16:
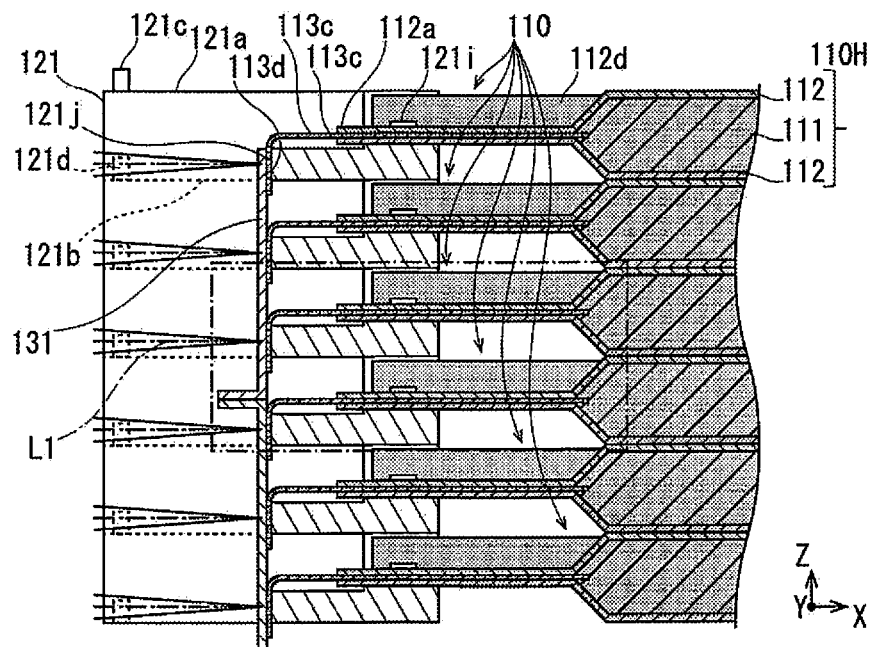
FIG. 16 is a side view illustrating a cross-section of the principle part of a state in which the bus bar is laser-welded to the electrode tabs of the stacked unit cells.
Figure 17:
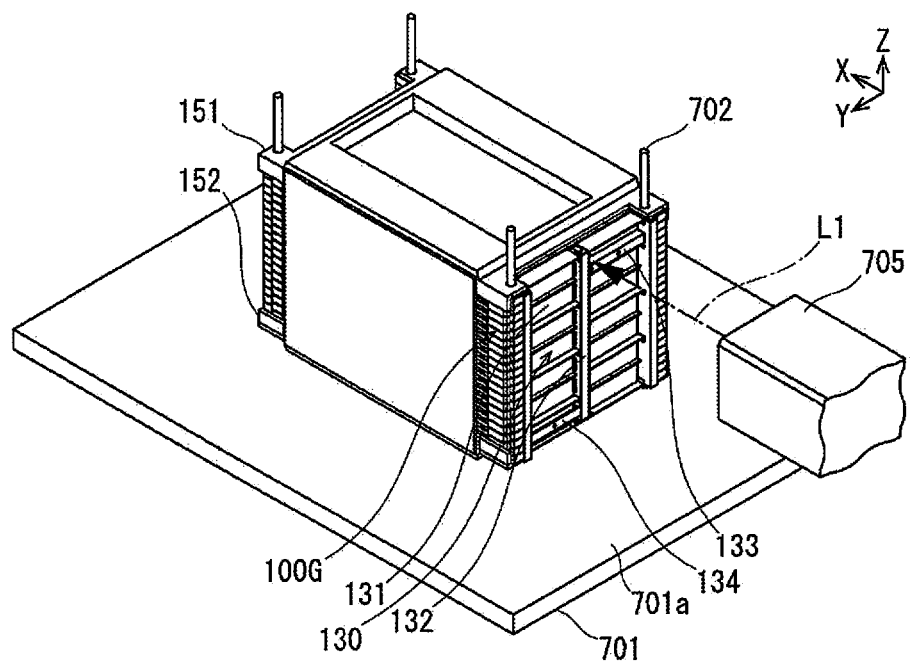
FIG. 17 is a perspective view schematically illustrating a state in which an anode side terminal and a cathode side terminal are laser-welded to an anode side bus bar and a cathode side bus bar, following FIG. 15 and FIG. 16.

FIG. 14 is a perspective view schematically illustrating a state in which a part of the members of the bus bar unit 130 is attached to the cell group 100G, following FIG. 13. FIG. 15 is a perspective view schematically illustrating a state in which the bus bar 131 of the bus bar unit 130 is laser-welded to the electrode tabs 113 of the unit cell 110, following FIG. 14. FIG. 16 is a side view illustrating a cross-section of the principle part of a state in which the bus bar 131 is laser-welded to the electrode tabs 113 of the stacked unit cells 110. FIG. 17 is a perspective view schematically illustrating a state in which an anode side terminal 133 and a cathode side terminal 134 are laser-welded to an anode side bus bar 131A and a cathode side bus bar 131K, following FIG. 15 and FIG. 16.

In the second joining step, the mounting table 701 rotates 90 degrees counterclockwise in the drawing to cause the electrode tabs 113 of the cell group 100G and the laser oscillator 705 to face each other, as illustrated in FIG. 14 and FIG. 15. Furthermore, the bus bar holder 132, by which the bus bars 131 are integrally held, is kept pressed while being abutted on the corresponding electrode tabs 113 of the cell group 100G by using a robot arm. Furthermore, the laser oscillator 705 irradiates the laser light L1 onto the bus bar 131 and joins the bus bar 131 to the distal end portions 113d of the electrode tabs 113 by seam welding or spot welding, as illustrated in FIG. 15 and FIG. 16. Then, the anode side terminal 133 is joined to the anode side bus bar 131A corresponding to the anode side terminal end (upper right in FIG. 5), from among the bus bars 131 arranged in a matrix, as illustrated in FIG. 17. In the same manner, the cathode side terminal 134 is joined to the cathode side bus bar 131K corresponding to the cathode side terminal end (lower left in FIG. 5), from among the bus bars 131 arranged in a matrix.

Next, the mounting step in which a protective cover 140 is attached to the bus bar 131 will be described, with reference to FIG. 18.

Figure 18:
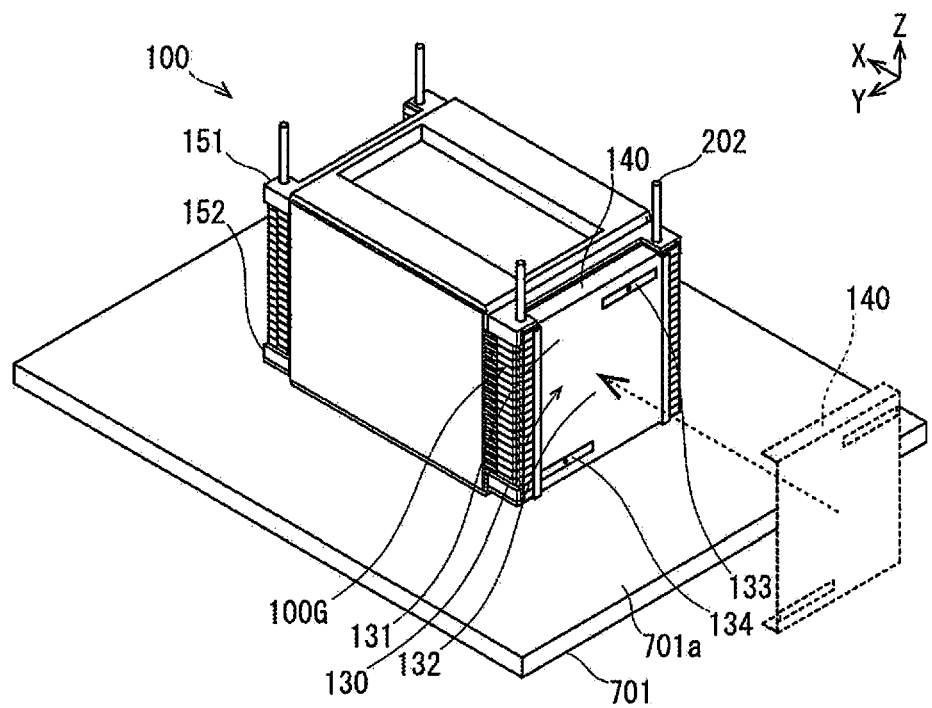
FIG. 18 is a perspective view schematically illustrating a state in which a protective cover is attached to the bus bar unit, following FIG. 17.

FIG. 18 is a perspective view schematically illustrating a state in which a protective cover 140 is attached to the bus bar unit 130, following FIG. 17.

In the mounting step, a protective cover 140 is attached to the bus bar unit 130 while fitting the upper end 140b and the lower end 140c of the protective cover 140 onto the bus bar unit 130, using the robot arm. The upper end 140b and the lower end 140c of the protective cover 140 may be joined to the bus bar unit 130 by using an adhesive. The protective cover 140 exposes the anode side terminal 133 to the outside from the first opening 140d and exposes the cathode side terminal 134 from the second opening 140e to the outside. The protective cover 140 covers the bus bar unit 130 to prevent the bus bars 131 from short-circuiting with each other and from coming in contact with an external member and being short-circuited or causing electrical leakage. When manufacture is completed, the battery pack 100 is removed from the mounting table 701 and carried out to an inspection step for inspecting the battery performance, and the like.

The manufacturing method of the battery pack 100 described with reference to FIGS. 11-18 may be embodied by an automatic machine in which all of the steps are controlled by a controller, a semiautomatic machine in which a portion of the steps are carried out by a worker, or a manual machine in which all of the steps are carried out by a worker.

According to the battery pack 100 and the method for assembling a battery pack 100 according to the first embodiment described above, the following action and effects are achieved.

In the first embodiment, the upper pressure plate 151 and the lower pressure plate 152 are disposed on the outer side of both ends of the cell group 100G in the stacking direction Z in the stacking step. Then, the cell group 100G is pressurized by using the upper pressure plate 151 and the lower pressure plate 152 in the pressurizing step. Then, the side plates are joined, i.e., welded, to the upper pressure plate 151 and the lower pressure plate 152, in a state in which the cell group 100G is pressurized in the stacking direction Z by using the upper pressure plate 151 and the lower pressure plate 152 in the first joining step. Through the joining described above, the upper pressure plate 151, the lower pressure plate 152, and the side plates 153 are joined in a state of being lower than the height when the same number of unit cells 110 as that of the cell group 100G are stacked in a non-loaded state. Accordingly, welding portions 153c, 153d are formed on the side plates 153.

By configuring in this manner, a state in which pressurizing force is imparted to the cell group 100G by using the upper pressure plate 151 and the lower pressure plate 152 is maintained, even after the welding described above. Accordingly, it is possible to further strengthen the frictional force that acts on the first cell sub-assembly 100M and the second cell sub-assembly 100N and to improve reliability against shock, even if shock is instigated from a direction orthogonal to the stacking direction Z.

Additionally, a second joining step for welding the bus bar 131 to the electrode tab 113 is carried out after the first joining step. In the present embodiment, the cell group 100G is pressurized by using an upper pressure plate 151 and a lower pressure plate 152. Accordingly, by joining the bus bar 131 to the electrode tab 113 after carrying out the first joining step to join the upper pressure plate 151 and the lower pressure plate 152 to the side plates 153, it is possible to join the bus bar 131 to the electrode tab 113 in the same state as the completed state. Therefore, it is possible to strongly fix the joining between the bus bar 131 and the electrode tab 113.

In addition, the welding portion 153c between the upper pressure plate 151 and the side plate 153, and the welding portion 153d between the lower pressure plate 152 and the side plate 153, may be configured from one welding portion formed linearly as an example.

Additionally, in the stacking step, a first spacer 121 is disposed at one end portion 112a where the unit cells 110 extend, and a second spacer 122 is disposed at the other end portion 112b, between adjacent unit cells 110. Then, the positions of the first spacer 121 and the second spacer 122 in the cell group 100G are fixed by using the upper pressure plate 151, the lower pressure plate 152, and the side plates 153 being welded in the first joining step. By configuring in this manner, it is possible to fix, not only the unit cells 110, but also the first spacer 121 and the second spacer 122, so as not to move inside the chassis 150 when shock is instigated.

Second Embodiment

Next, the battery pack and the method of assembling the same according to the second embodiment will be described.

Figure 19:
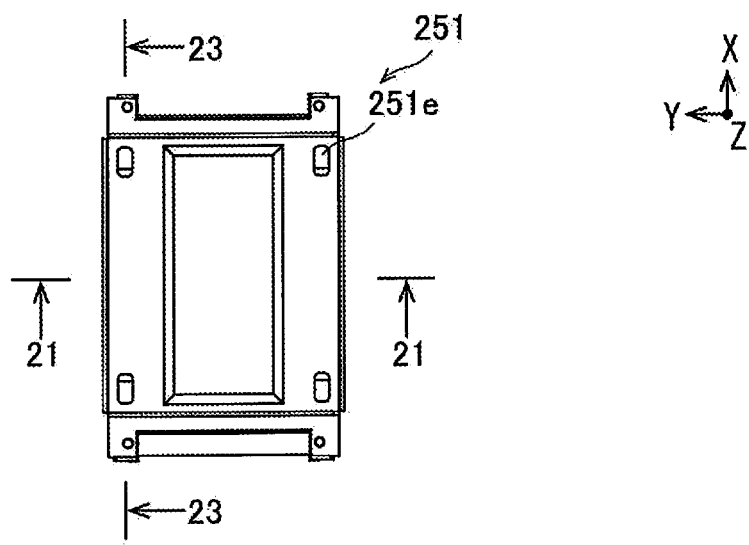
FIG. 19 is a plan view illustrating the battery pack according to the second embodiment.
Figure 20:
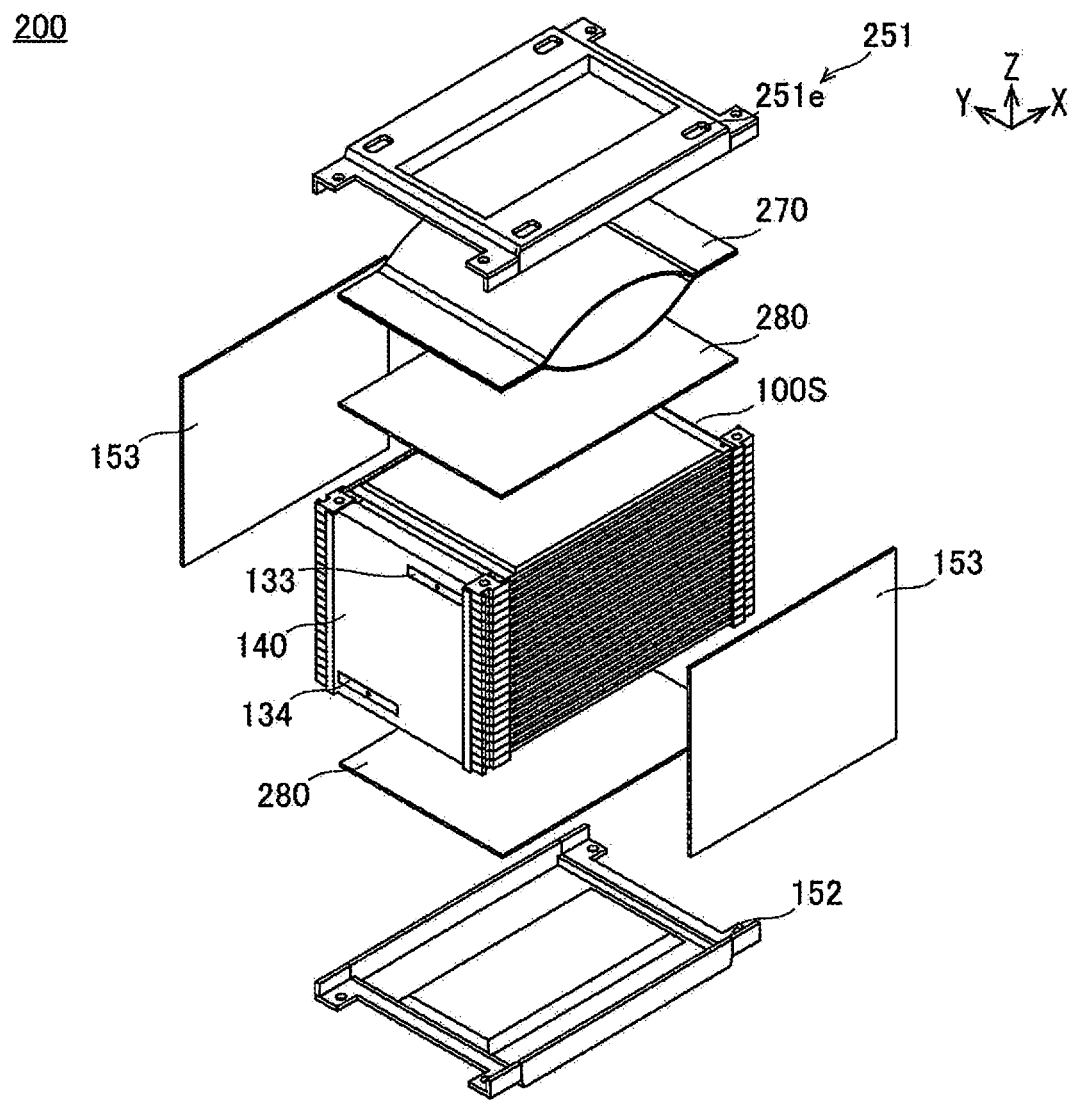
FIG. 20 is a perspective view illustrating a state in which the entire stacked body, in a state in which an upper pressure plate, a lower pressure plate, left and right side plates, and an elastic member are disassembled from the battery pack according to the second embodiment and a protective cover is attached thereto, is exposed.

FIG. 19 is a perspective view illustrating the battery pack according to the second embodiment, and FIG. 20 is a perspective view illustrating a state in which the entire stacked body, in a state in which an upper pressure plate, a lower pressure plate, left and right side plates, and an elastic member are disassembled from the battery pack according to the second embodiment and a protective cover is attached thereto, is exposed.

In the first embodiment, an embodiment was described in which the chassis 150 is disposed and covered on the outer side of the stacked body 100S. However, to provide an overview with reference to FIG. 20, in the battery pack 200 according to the second embodiment, compared to the first embodiment, regarding the chassis 150 of the battery pack 200, the configuration of the upper pressure plate 251 having a hole 251e is different from the upper pressure plate 151 of the first embodiment, and, further, configurations of an elastic member 270 disposed in any position between the stacked bodies 100S in the stacking direction, and an intermediate member 280 disposed in any position in the stacking direction, are added. Since that other than the above is the same as the first embodiment, descriptions thereof are omitted.

Figure 21A:
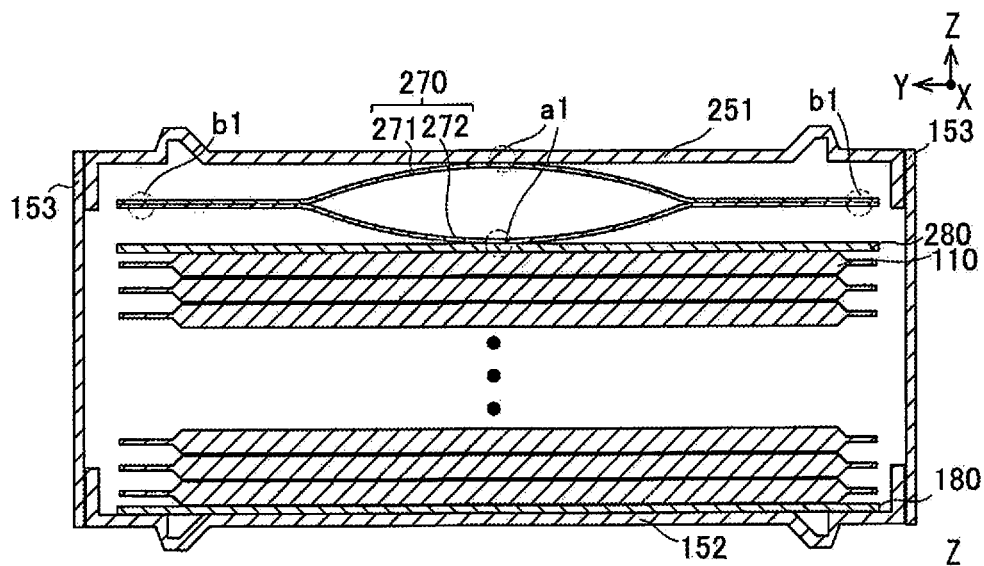
FIG. 21A is a cross-sectional view taken along the 21-21 line of FIG. 19, and FIG. 21B and FIG. 21C are cross-sectional views illustrating modified examples of FIG. 21A.
Figure 21B:
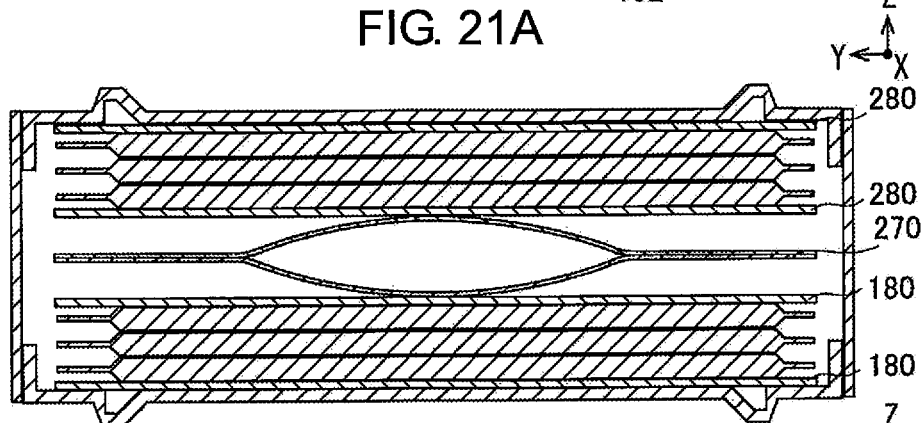
Figure 21C:
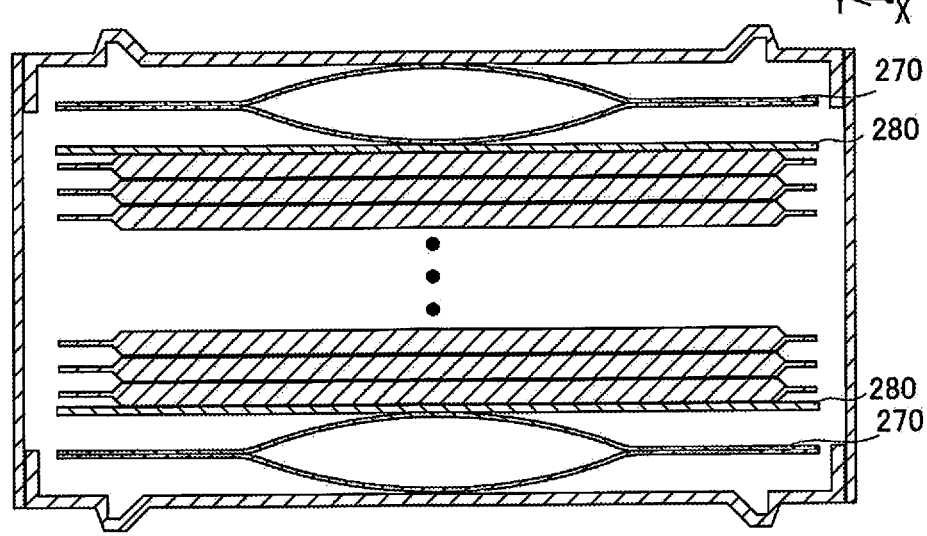
Figure 22A:
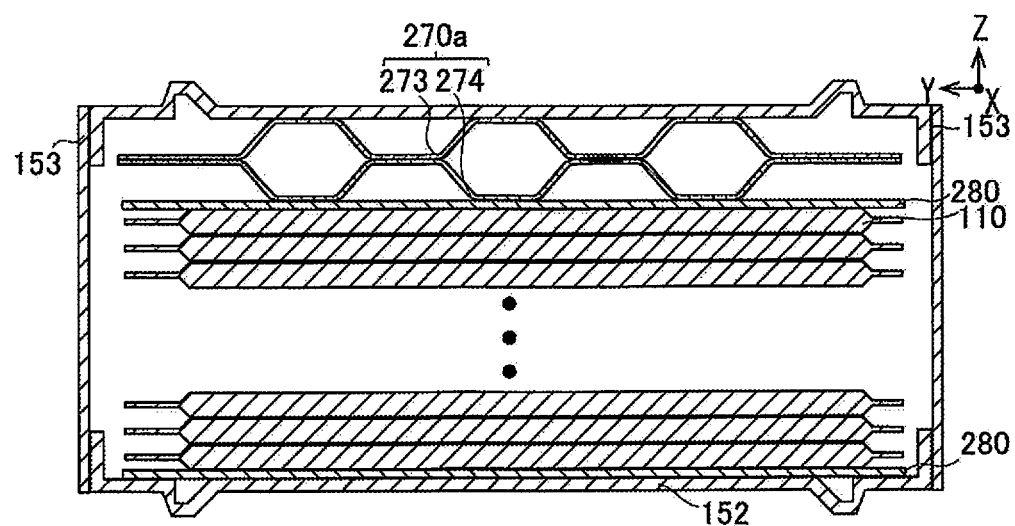
FIG. 22A and FIG. 22B are cross-sectional views illustrating modified examples of FIG. 21A.
Figure 22B:
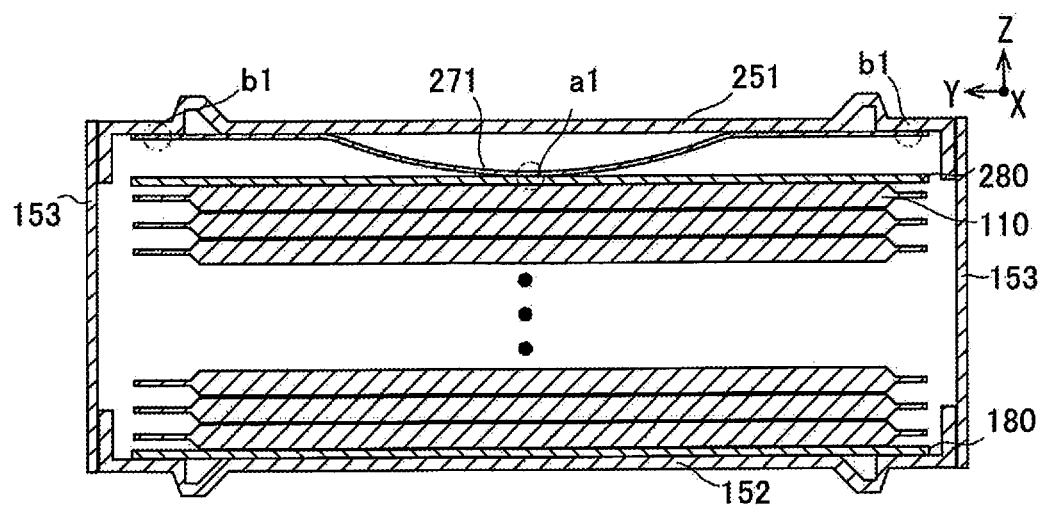

FIG. 21A is a cross-sectional view taken along the 21-21 line of FIG. 19, FIG. 21B and FIG. 21C are cross-sectional views illustrating modified examples of FIG. 21A, and FIG. 22A and FIG. 22B are cross-sectional views illustrating modified examples of FIG. 21A.

The elastic member 270 is used for absorbing changes in the thickness of the cell group 100G due to, for example, charging and discharging of the battery in the stacking direction Z when using the battery pack 200. The elastic member 270 generates resilient force or elastic force in the stacking direction Z by welding the side plates 153 in a state in which a pressurizing force is generated by using the upper pressure plate 251 and the lower pressure plate 152. The elastic member 270 is configured to enable elastic members 271, 272 to have a relatively high spring constant, formed in a curved shape in the center and flat at the ends, when viewed in cross-section, as illustrated in FIG. 21A, and the like.

The elastic member 271 and the elastic member 272 are disposed along the stacking direction Z, such that the orientations of the curved surfaces are reversed, as illustrated in FIG. 21A. The curved surface of the elastic member 271 comes in contact with the adjacent upper pressure plate 251 at a contact point al. The contact point al is positioned more inward than the outer perimeter of the elastic member 271 when viewed in plan view from the stacking direction Z, and the upper pressure plate 251 and the elastic member 271 are joined at the contact point al. The curved surface of the elastic member 272 comes in contact with an adjacent intermediate member 280 at a contact point al, in the same manner as the elastic member 271. The contact point al is positioned more inward than the outer perimeter of the elastic member 272 when viewed in plan view from the stacking direction Z, and the intermediate member 280 and the elastic member 272 are joined at the contact point al. In the present embodiment, the contact points al are positioned substantially in the center of the elastic members 271, 272. The resilient force described above becomes particularly high at the contact points al.

The elastic member 271 comes in contact with and is joined to the contact point b1, which is in the vicinity of the outer perimeters of the elastic member 272 and the elastic member 271, as illustrated in FIG. 21A. The contact point al is positioned more inward than the contact point b1. The elastic members 271, 272 are sometimes referred to as plate springs, and an example of a material thereof is rolled steel. However, there is no limitation thereto, as long as the material is capable of absorbing changes in the thickness of the battery pack 200 in the stacking direction Z, due to charging and discharging reaction, or the like.

In FIG. 21A, the elastic member 270 is disposed on the upper end of the cell group 100G in the stacking direction. However, no limitation is imposed thereby, and the elastic member may be disposed in a position that is not on the two ends of the cell group 100G, for example, the center, etc., in the stacking direction Z, as illustrated in FIG. 21B, as long as it is possible to absorb changes in the thickness of the cell group 100G in the battery pack 200 in the stacking direction Z. In addition, the elastic member 270 may be disposed on the upper end and the lower end of the cell group 100G in the stacking direction Z, as illustrated in FIG. 21C. Additionally, the shape of the elastic member 270 is not limited to FIG. 21A to FIG. 21C.

Other than the above, for example, the elastic member may be configured from an elastic member 270a having an elastic member 273 provided with, for example, three shapes that are convex on one of the sides from the flat portion at the outer perimeter and an elastic member 274 disposed by symmetrically inverting the elastic member 273, as illustrated in FIG. 22A. Additionally, in FIG. 21A, the elastic member 270 is configured from two elastic members 271, 272, but the number thereof is not limited thereto, as long as it is possible to absorb the changes in the thickness of the cell group 100G in the stacking direction Z. Other than the above, for example, the elastic member may be configured from one elastic member 271, as illustrated in FIG. 22B.

The intermediate member 280 is disposed to prevent the elastic member 270 from being directly joined to the cell group 100G. The intermediate member 280 is disposed between the elastic member 270 and the adjacent unit cell 110, or at the end portion on the opposite side of the elastic member 270 in the stacking direction Z, as illustrated in FIG. 21A and FIG. 21B. The intermediate member 280 has, for example, a flat shape and is configured from a metal. However, the intermediate member may be configured from another material, and the shape is not limited to a flat shape, as long as it is possible to prevent direct joining between the elastic member 270 and the unit cell 110 and be able to withstand use as a battery.

Figure 23:
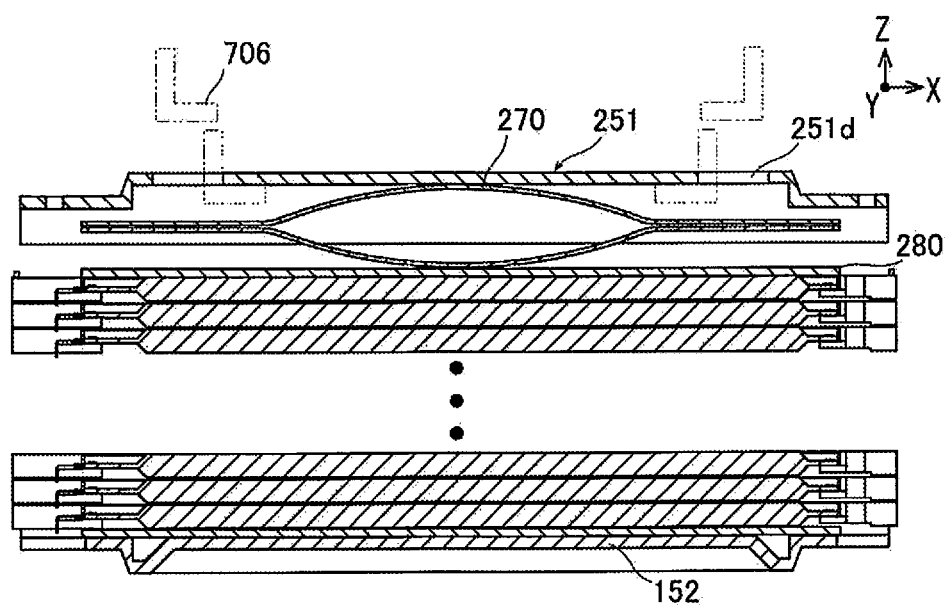
FIG. 23 is a cross-sectional view taken along the 23-23 line of FIG. 19.

The upper pressure plate 251 comprises a hole 251e used when clamping and transporting the battery pack 200, as illustrated in FIG. 20, FIG. 23, and the like. The hole 251e is configured such that a clamp member 706 on the equipment side can enter inside the chassis at, for example, the four corners of the upper pressure plate 251, as illustrated in FIG. 23. In the clamp member 706 that clamps the battery pack 200, there are cases in which the distal end of the clamping location has an L shape, for example, as illustrated by the chain double-dashed line in FIG. 23. By configuring the hole 251e as described above, the clamp member 706 on the equipment side is able to enter the hole 251e and lift up the upper pressure plate 251 by hooking the flat portion of the L shape onto the inner wall of the upper pressure plate 251.

That the clamp member 706 has an L shape was described above, but the shape of the clamp member may be other than the above, as long as it is possible to enter the hole 251e and lift up the upper pressure plate 251 or the battery pack 200 including the upper pressure plate 251.

In the method for assembling a battery pack according to the second embodiment, at the time of the stacking step, in addition to a lower pressure plate 152, a first cell sub-assembly 100M, a second cell sub-assembly 100N, and an upper pressure plate 251, an elastic member 270 and an intermediate member 280 are arranged along the stacking direction Z, as illustrated in FIG. 20. When the elastic member 270 is disposed adjacent to the intermediate member 280, the elastic member 272 and the intermediate member 280 are welded at the contact point al. Then, the elastic member 271 is welded to the adjacent upper pressure plate 251 at the time of the first joining step. Since that other than the above is the same as the first embodiment, descriptions thereof are omitted.

The elastic members 271, 272 configuring the elastic member 270 may be joined in advance before the stacking step. In addition, the elastic members 271, 272 may be welded before welding to the adjacent upper pressure plate 251 and the intermediate member 280 in the first joining step.

Next, the action and effects of the battery pack 200 and the method of assembling the same according to the second embodiment will be described. In the second embodiment, the elastic member 270 is configured to be disposed in any position in the stacking direction Z, as illustrated in FIG. 21A to FIG. 21C. The elastic member 270 generates resilient force in the stacking direction Z, by welding and joining the upper pressure plate 251 and the lower pressure plate 152 to the side plates 153. By configuring in this manner, it is possible to appropriately adjust the height in the stacking direction Z, even if the thickness of the cell group 100G changes when using the battery pack 200. Accordingly, it is possible to prevent the first cell sub-assembly 100M and the second cell sub-assembly 100N from moving due to instigation of shock, even if the thickness of the cell group 100G changes during actual use.

In addition, the contact point al, where the elastic member 270 and the adjacent member are joined, is provided more inward than the outer perimeter of the elastic member 270 when viewed in plan view from the stacking direction Z, substantially in the vicinity of the center in the case of the present embodiment. The substantially central portion configured in a curved surface has a higher pressurizing force compared to the outer perimeter, and the pressurizing force decreases when moving away outward. If the elastic member 270 is configured as described above, gas that is generated when using the battery pack 200 moves to a location where the pressurizing force is relatively weak in the elastic member 270. Since the vicinity of the substantial center of the battery pack 200 is a location in which electrochemical reactions actively take place, it is possible to suppress deterioration in the battery performance by configuring as described above.

In addition, the elastic member 270 comprises a plurality of elastic members 271, 272, and the elastic members 271, 272 are joined at a contact point b1 positioned more outward than the contact point al, where the elastic members are joined to the adjacent upper pressure plate 251 and the intermediate member 280, as viewed in plan view. By configuring in this manner, even if restorative force occurs in the elastic members 271, 272, the restorative force acts not only in the stacking direction Z, but is dispersed outward of the elastic members 271, 272, which is a direction orthogonal to the stacking direction Z. Accordingly, it is possible to prevent excessive restorative force from being imparted to the upper pressure plate 251 and the lower pressure plate 252, and to suppress deformation of the upper pressure plate 251 and the lower pressure plate 152.

In addition, the upper pressure plate 251 is configured to have a hole 251e into which a clamp member 706 that clamps onto the battery pack 200 enters. Accordingly, it is not necessary to separately provide a hook-like shape that is hooked by using a clamp shape on the outer surface of the battery pack 200, which contributes to downsizing of the battery pack 200.

Third Embodiment

Figure 24A:
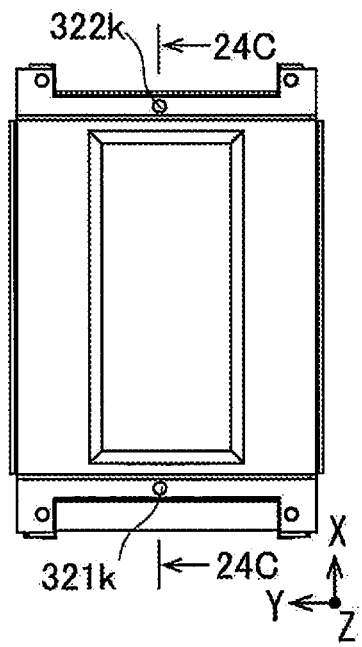
FIG. 24A and FIG. 24B are plan views illustrating the battery pack according to the third embodiment.
Figure 24B:
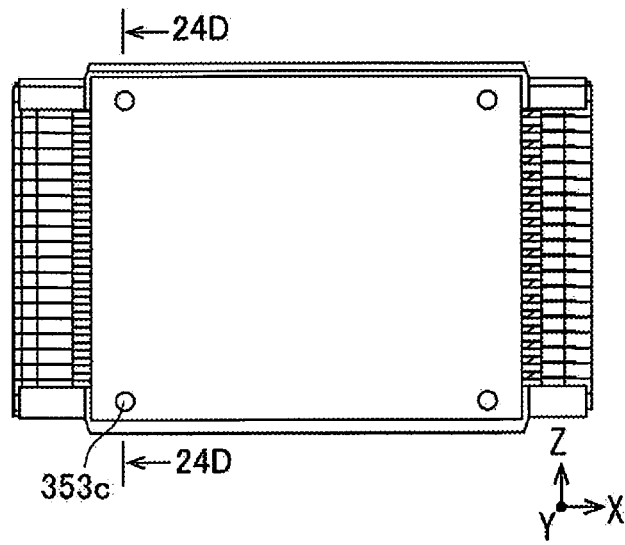
Figure 24C:
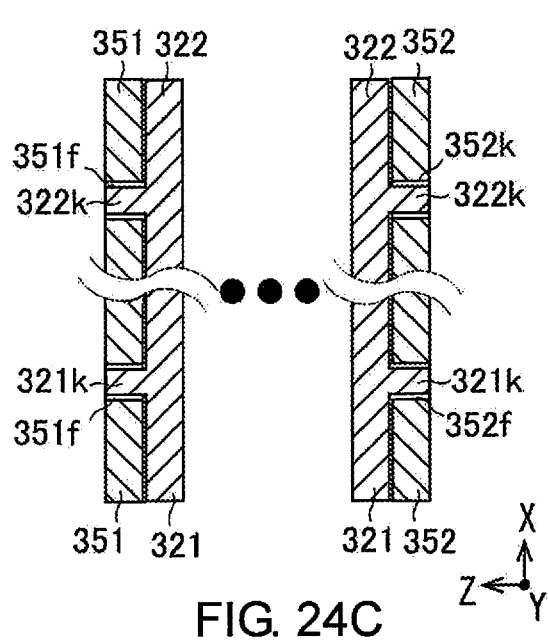
FIG. 24C is a partial cross-sectional view taken along the 24C-24C line of FIG. 24A illustrating the engagement of convex/concave shapes.
Figure 24D:
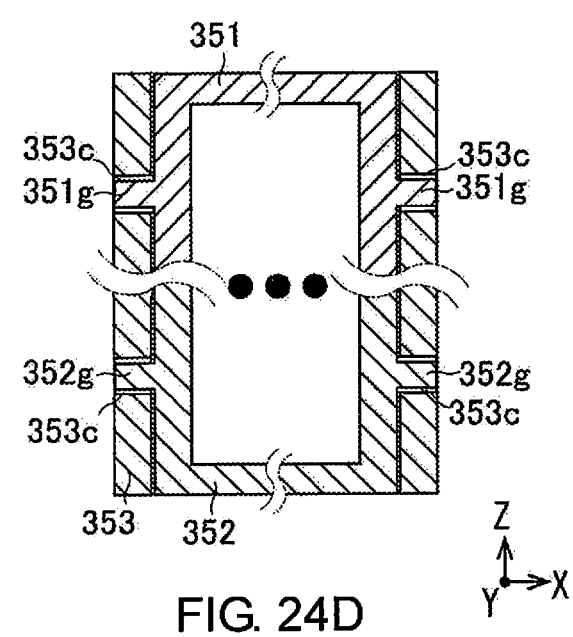
FIG. 24D is a partial cross-sectional view taken along the 24D-24D line of FIG. 24B illustrating the engagement of convex/concave shapes.

FIG. 24A and FIG. 24B are plan views illustrating the battery pack according to the third embodiment, FIG. 24C is a partial cross-sectional view taken along the 24C-24C line of FIG. 24A illustrating the engagement of the convex/concave shapes, and FIG. 24D is a partial cross-sectional view taken along the 24D-24D line of FIG. 24B illustrating the engagement of the convex/concave shapes.

To provide an overview of the battery pack 300 according to the third embodiment with reference to FIG. 24A to FIG. 24D, a third spacer 321 provided with an engagement portion 321k and a fourth spacer 322 provided with an engagement portion 322k, which configure the cell group 100G and carry out positioning; an upper pressure plate 351 provided with engagement portions 351f, 351g having a positioning function, a lower pressure plate 352 provided with engagement portions 352f, 352g having a positioning function, and a side plate 353 provided with an engagement portion 353c having a positioning function, which configure the chassis 150, are different from the configuration of the first embodiment. Since the other configurations are the same as the first embodiment, descriptions thereof are omitted.

The engagement portion 321k is provided for positioning an upper pressure plate 351 and a lower pressure plate 352 that are adjacent to each other in the stacking step, and is formed in a convex shape, as illustrated in FIG. 24A and FIG. 24C. The engagement portion 321k is disposed substantially in the center of the third spacer 321 in the short side direction Y. The engagement portion 322k is provided on the fourth spacer 322 for positioning the upper pressure plate 351 and the lower pressure plate 352, in the same manner as in the third spacer 321, and is formed in a convex shape. The third spacer 321 is the same as the first spacer 121 in the first embodiment, excluding the engagement portion 321k. In addition, the fourth spacer 322 is the same as the second spacer 122 in the first embodiment, excluding the engagement portion 322k.

The engagement portion 351f of the upper pressure plate 351 engages with the engagement portion 321k of the third spacer 321 and the engagement portion 322k of the fourth spacer 322, and is formed in a concave shape. In the same manner, the engagement portion 352f of the lower pressure plate 352 engages with the engagement portion 321k of the third spacer 321 and the engagement portion 322k of the fourth spacer 322, and is formed in a concave shape. The third spacer 321 and the fourth spacer 322 are attached to an adjacent unit cell 110. Accordingly, positioning of the upper pressure plate 351 and the lower pressure plate 352 with respect to the cell group 100G is carried out by engaging the engagement portion 321k of the third spacer 321 with the engagement portions 351f, 352f, and engaging the engagement portion 322k of the fourth spacer 322 with the engagement portions 351f, 352f.

In addition, the engagement portion 351g of the upper pressure plate 351 is provided for positioning with respect to the side plate 353, and is formed in a convex shape, as illustrated in FIG. 24D. In the same manner, the engagement portion 352g of the lower pressure plate 352 is provided for positioning with respect to the side plate 353, and is formed in a convex shape. Correspondingly, the engagement portion 353c of the side plate 353 is provided for positioning with the engagement portion 351g of the upper pressure plate 351 and the engagement portion 352g of the lower pressure plate 352, and is formed in a concave shape. By configuring the engagement portions 351g, 352g, 353c in this manner, positioning of the side plate 353 with respect to the upper pressure plate 351 and the lower pressure plate 352 is carried out.

The engagement portion 353c is provided on four corners of a rectangular side plate 353. The engagement portions 321k, 322k, 351f, 351g, 352f, 352g, 353c are provided at a plurality of locations, as illustrated in FIG. 24A and FIG. 24B.

Next, the action and effects of the battery pack 300 according to the third embodiment will be described. In the present embodiment, a convex engagement portion 321k is provided on a third spacer 321 adjacent to the upper pressure plate 351 and the lower pressure plate 352, and a convex engagement portion 322k is provided on the fourth spacer 322, as illustrated in FIG. 24C. In addition, a concave engagement portion 351f is provided on the upper pressure plate 351 and a concave engagement portion 352f is provided on the lower pressure plate 352. By configuring in this manner, the upper pressure plate 351 can be easily aligned with the third spacer 321 and the fourth spacer 322, and the lower pressure plate 352 can be easily aligned with the third spacer 321 and the fourth spacer 322. Additionally, since the engagement portions 321k, 322k, 351f, 352f are parallel to the stacking direction Z, the convex/concave shapes do not break even when pressurized in the stacking direction Z, and it is possible to secure the positioning function.

In addition, a convex engagement portion 351g for positioning with respect to the side plate 353 is provided on the upper pressure plate 351, and a convex engagement portion 352g for positioning with respect to the side plate 353 is provided on the lower pressure plate 352, as illustrated in FIG. 24D. Additionally, the side plate 353 is provided with an engagement portion 353c that engages with the engagement portion 351g of the upper pressure plate 351 and the engagement portion 352g of the lower pressure plate 352. Accordingly, positioning between the upper pressure plate 351 and the side plate 353, as well as between the lower pressure plate 352 and the side plate 353, can also be facilitated. In addition, if positioning is carried out in a state in which pressurizing force is imparted in the stacking direction Z, pressurizing force is not applied to the engagement portions 351g, 352g; therefore, it is possible to prevent breakage of the engagement portions 351g, 352g.

Furthermore, a plurality of engagement portions 321k, 322k, 351g, 352f, 352g may be provided, and it is thereby possible to improve the precision of alignment of each member.

Figure 25A:
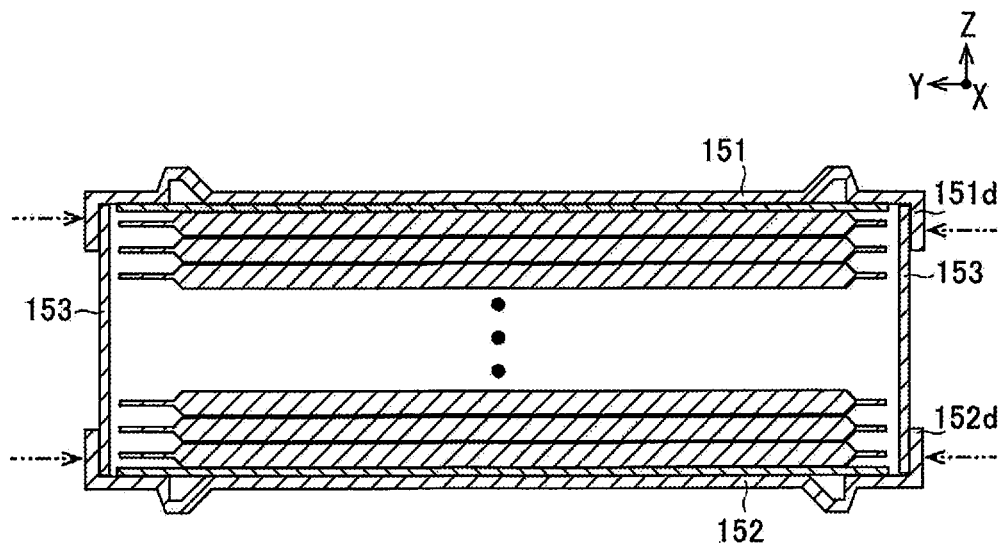
FIG. 25A and FIG. 25B are cross-sectional views illustrating modified examples of FIG. 9.
Figure 25B:
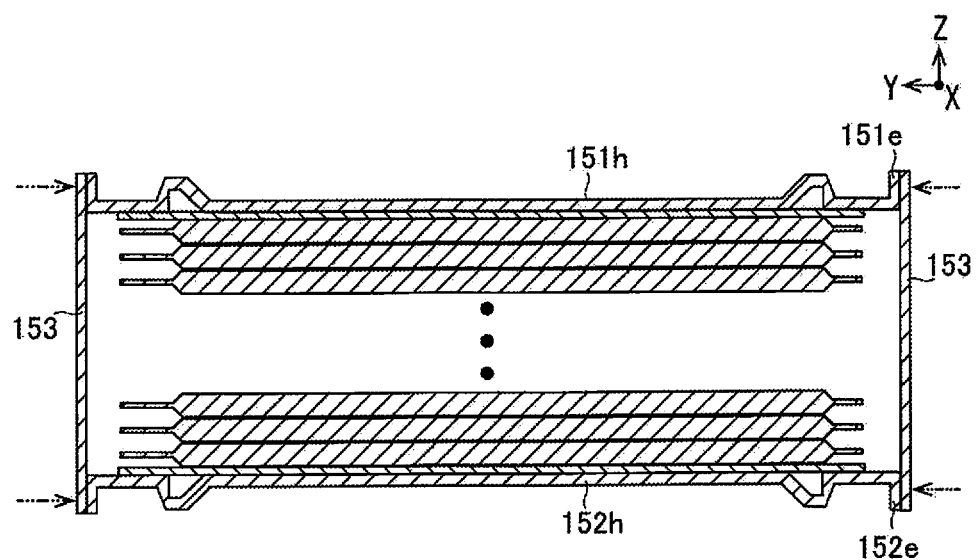
Figure 26A:
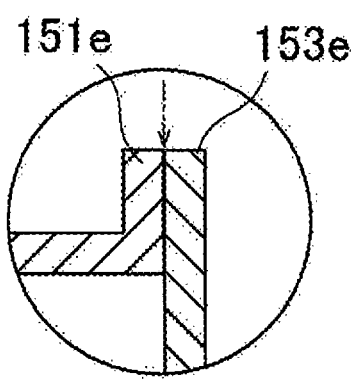
FIG. 26A is a partially enlarged view illustrating the A portion of FIG. 25B.
Figure 26B:
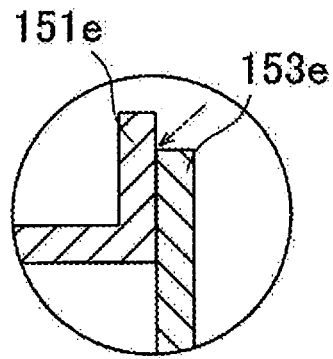
FIG. 26B is a partially enlarged view illustrating a modified example of FIG. 26A.
Figure 26C:
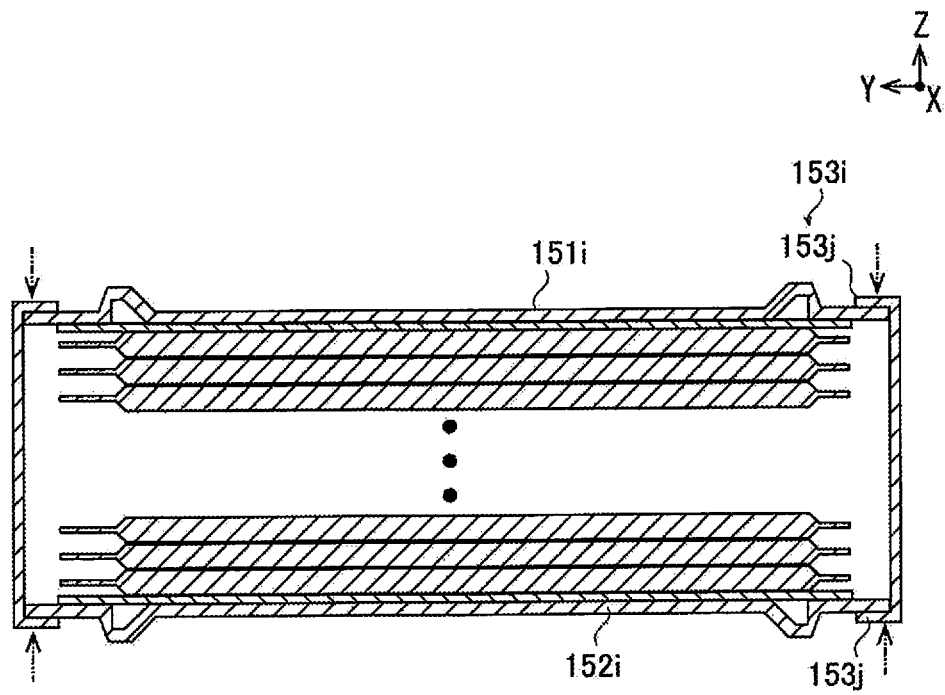
FIG. 26C is a cross-sectional view illustrating a modified example of FIG. 9.
Figure 27A:
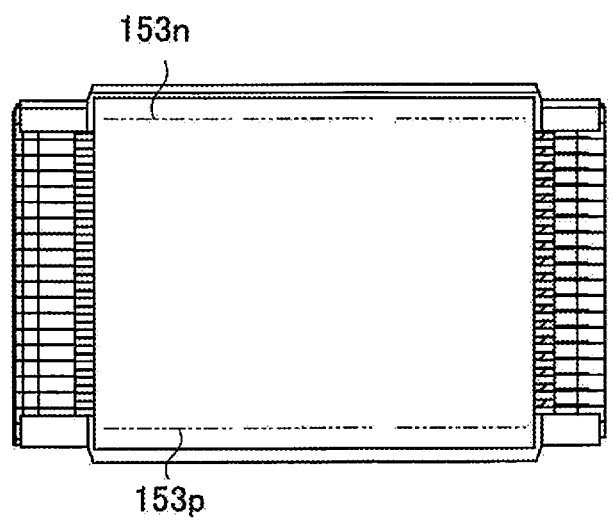
FIG. 27A and FIG. 27B are side views illustrating modified examples of FIG. 2B.
Figure 27B:
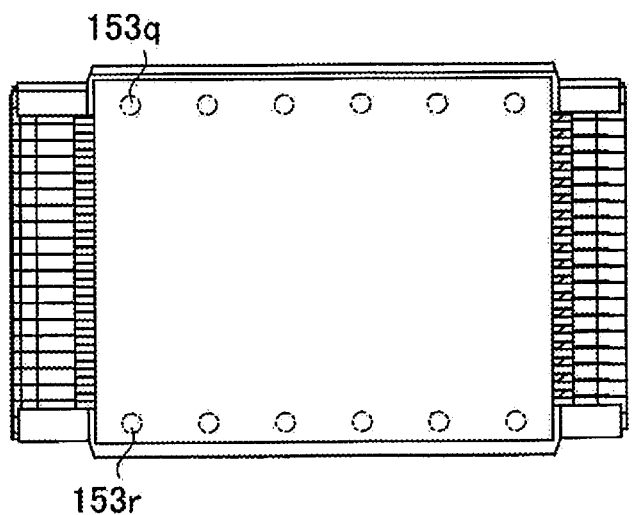

The present invention is not limited to the embodiments described above, and various modifications are possible within the scope of the claims. FIG. 25A and FIG. 25B are cross-sectional views illustrating modified examples of FIG. 9. FIG. 26A is a partially enlarged view illustrating the A portion of FIG. 25B, FIG. 26B is a partially enlarged view illustrating a modified example of FIG. 26A, and FIG. 26C is a cross-sectional view illustrating a modified example of FIG. 9. FIG. 27A and FIG. 27B are side views illustrating modified examples of FIG. 2B.

In the first embodiment, an embodiment was described in which the side plates 153 are disposed and joined outward of the bent portion 151*d* of the upper pressure plate 151 and the bent portion 152*d* of the lower pressure plate 152, as illustrated in FIG. 9. In addition to the above, the side plates 153 may be disposed inward of the bent portion 151*d* of the upper pressure plate 151 and the bent portion 152*d* of the lower pressure plate 152, to weld the upper pressure plate 151, the lower pressure plate 152, and the side plate 153, as illustrated in FIG. 25A.

Additionally, an embodiment was described in which the bent portion 151*d* of the upper pressure plate 151 and the bent portion 152*d* of the lower pressure plate 152 are bent inward in the stacking direction Z in FIG. 9, but no limitation is imposed thereby. In addition to the above, a bent portion 151*e* of an upper pressure plate 151*h* and a bent portion 152*e* of a lower pressure plate 152*h* may be bent outward in the stacking direction Z, as illustrated in FIG. 25B. Then, the two may be welded by disposing the side plate 153 more outward than the bent portion 151*e* and the bent portion 152*e* in the short side direction Y.

Additionally, in FIG. 25B and FIG. 26A, welding is configured to be carried out in a state in which the end portion of the bent portion 151*e* of the upper pressure plate 151*h* and the end portion 153*e* of the side plate 153 match. However, no limitation is imposed thereby; in addition to the above, welding may be carried out in a state in which the end portion of the bent portion 151*e* of the upper pressure plate 151*h* protrudes more than the end portion 153*e* of the side plate 153, or the positional relationship between the bent portion 151*e* and the end portion 153*e* may be reversed, as illustrated in FIG. 26B.

In addition, an embodiment was described in which the end portions of the upper pressure plate and the lower pressure plate are bent to form bent portions in F9, FIG. 26A, and FIG. 26B, but no limitation is imposed thereby. In addition to the above, bent portions may be formed by bending the end portions 153*j* of the side plate 153*i*, and welded with the upper pressure plate 151*i* and the lower pressure plate 152*i*, as illustrated in FIG. 26C. The chain double-dashed line arrows in FIG. 25A, FIG. 25B, and FIG. 26C indicate the welding positions in the present embodiment as an example.

Additionally, an embodiment was described in FIG. 2B in which a linear welding portion 153*c* with the upper pressure plate 151 is formed at one location, and a linear welding portion 153*d* with the lower pressure plate 152 is formed at one location on the side plate 153, but no limitation is imposed thereby. In addition to the above, linear welding portions 153*n* with the upper pressure plate and linear welding portions 153*p* with the lower pressure plate 152 may be provided at a plurality of locations, as illustrated in FIG. 27A. Additionally, the welding portion may be configured to respectively provide spot-like, rather than linear, welding portions 153*q*, 153*r* on the side plate 153, as illustrated in FIG. 27B.

The invention claimed is:

1. A method for assembling a battery pack having a cell group including a plurality of unit cells stacked in a thickness direction, each of the unit cells including a cell body having a flat shape by sealing a power generation element using laminate films, and an electrode tab protruding out from the cell body, and the battery pack further having a bus bar electrically connecting the unit cells, the method comprising:

a step of stacking the plurality of the unit cells such that distal end portions of the electrode tabs of the unit cells are bent along a stacking direction of the unit cells;

a step of disposing a pair of first cover members on an outer side of both ends of the unit cells in the stacking direction;

a step of disposing a pair of second cover members on the outer side of both ends of the unit cells in a direction that intersects with the stacking direction and that also intersects with a direction in which the electrode tabs extend;

a step of welding the first cover members and the second cover members while the cell group obtained by stacking the unit cells is pressurized from both sides of the cell group in the stacking direction using the first cover members, the welding of the first cover members and the second cover members being performed prior to electrically connecting the unit cells by the bus bar; and a step of laser-welding the bus bar to distal end portions of the electrode tabs that are bent along the stacking direction after the first cover members and the second cover members are welded.

2. The method according to claim 1, wherein
the welding of the first cover members and the second cover members is performed in a spot or linear manner.

3. The method according to claim 1, wherein
the cell group further comprises a spacer disposed between the unit cells that are adjacent in the stacking direction at an end portion of a direction in which the unit cells extend in the flat shape, the spacer is disposed before the first cover members and the second cover members are welded, and
the spacer in the cell group is fixed in a position by welding the first cover members and the second cover members when pressurizing force is imparted to the cell group by the first cover members.

4. The method according to claim 1, further comprising
disposing an elastic member is in any position in the stacking direction to generate resilient force in the elastic member along the stacking direction upon the welding of the first cover members and the second cover members.

5. The method according to claim 4, wherein
the elastic member includes a leaf spring, and
the welding of the first cover members and the second cover members generates the resilient force more inward than an outer perimeter when the leaf spring is viewed from the stacking direction.

6. The method according to claim 4, wherein
the elastic member includes a plurality of leaf springs being arranged adjacent to each other, and
adjacent ones of the leaf springs are joined to each other at a more outward location than a location where the resilient force is generated when viewed from the stacking direction.

7. The method according to claim 5, wherein
the elastic member is disposed between one of the unit cells and one of the first cover members, and further comprising
clamping the first cover member using a clamp member that enters a hole on the one of the first cover member.

8. The method according to claim 4, further comprising
disposing a flat intermediate member between the elastic member and one of the unit cells that is adjacent to the elastic member in the stacking direction or in a position adjacent to one of the first cover members in the stacking direction.

9. The method according to claim 1, further comprising
disposing another spacer that is connected with one of the unit cells that is adjacent to at least one end portion of the cell group in the stacking direction, and
the another spacer and at least one of the first cover members that are adjacent to the another spacer being engaged with each other to align the at least one of the first cover members with respect to the cell group.

10. The method according to claim 9, wherein
at least one of the second cover members and the first cover members are engaged with each other to align the at least one of the second cover members with respect to the first cover members.

11. The method according to claim 10, wherein
alignment of the first cover member with respect to the cell group and alignment of the second cover member with respect to the first cover members are carried out at a plurality of locations.

12. A battery pack comprising:
a cell group including a plurality of unit cells stacked in a thickness direction, each of the unit cells including a cell body having a flat shape by sealing a power generation element using laminate films and an electrode tab protruding out from the cell body;
a bus bar electrically connecting the unit cells; and
a pair of first cover members covering the cell group from both sides in a stacking direction of the unit cells; and
a pair of second cover members covering the cell group from both sides in a direction that intersects with the stacking direction and that also intersects with a direction in which the electrode tabs extend,
the pair of first cover members covering the cell group such that the cell group is pressurized along the stacking direction of the unit cells,
the electrode tabs having bent distal end portions that are bent in the stacking direction of the unit cells, and the bus bar being laser-welded to the bent distal end portions, and
the electrode tabs and bus bar being disposed on an open portion of the pair of first cover members and the pair of second cover members, the open portion of the pair of first cover members and the pair of second cover members being disposed adjacent to the cell group in the direction in which the electrode tabs extend.

13. The battery pack according to claim 12, wherein
the first cover members and the second cover members are joined by joining points between the first cover members and the second cover members in a spot or a linear manner.

14. The battery pack according to claim 12, wherein
the cell group further comprises a spacer disposed between the unit cells that are adjacent in the stacking direction, the spacer being disposed at an end portion of a direction in which the unit cells extend in a flat shape.

15. The battery according to claim 12, wherein further comprising an elastic member disposed in any position in the stacking direction for generating resilient force along the stacking direction.

16. The battery pack according to claim 15, wherein
the elastic member comprises a leaf spring, and
the resilient force is generated more inward than an outer perimeter when the leaf spring is viewed from the stacking direction.

17. The battery pack according to claim 16, wherein
the elastic member comprises a plurality of leaf springs that are adjacent to each other, and
the leaf springs are joined to each other at locations more outward than a location where the resilient force is generated when the leaf springs are viewed from the stacking direction.

18. The battery pack according to claim 15, wherein
the elastic member is disposed between one of the unit cells and one of the first cover members, and
the one of the first cover members includes a hole through which a clamp member for clamping the one first cover member passes from outside with respect to the one of the first cover members at a location more outward than the location where the resilient force is generated when the one of the first cover members is viewed from the stacking direction.

19. The battery pack according to claim 15, further comprising
a flat intermediate member disposed between the elastic member and one of the unit cells that is adjacent to the elastic member in the stacking direction or in a position adjacent to one of the first cover members in the stacking direction.

20. The battery pack according to claim 12, further comprising
another spacer connected to one of the unit cells adjacent to at least one end portion of the cell group in the stacking direction, and
the another spacer and at least one of the first cover members that are adjacent to the another spacer, each comprises an engagement portion that is engaged with another engagement portion to align the one of the first cover members with respect to the cell group.

21. The battery pack according to claim 20, wherein
at least one of the second cover members and the first cover members, respectively, comprise engagement portions that are engaged with each other to align the at least one of the second cover member with respect to the first cover members.

22. The battery pack according to claim 20, wherein
the another spacer includes a plurality of the engagement portions and the first cover member includes a plurality of the other engagement portions.

23. The method according to claim 1, further comprising a step of assembling the bus bars to the cell group after the step of welding the first cover members and the second cover members, wherein:
the step of welding the first cover members and the second cover members is performed in a state in which the bus bars are not assembled to the cell group, and
the step of laser-welding the bus bar to the distal end portions of the electrode tabs is performed after the bus bars are assembled to the cell group.

24. The battery pack according to claim 12, further comprising a protective cover erected along the stacking direction, wherein:
the pair of first cover members compresses the cell group in a state in which the cell group is housed inside the pair of first cover members and the pair of second cover members, and
the protective cover comprises openings where the electrode tabs and the bus bar are arranged in a state in which the cell group is housed inside the pair of first cover members and the pair of second cover members.

* * * * *